US007912755B2

(12) United States Patent
Perry et al.

(10) Patent No.: US 7,912,755 B2
(45) Date of Patent: Mar. 22, 2011

(54) METHOD AND SYSTEM FOR IDENTIFYING PRODUCT-RELATED INFORMATION ON A WEB PAGE

(75) Inventors: Bradley John Perry, Boulder, CO (US); Nancy Ann Perry, Boulder, CO (US); Daniel Carl Marriott, New York, NY (US)

(73) Assignee: Pronto, Inc., New York, NY (US)

( * ) Notice: Subject to any disclaimer, the term of this patent is extended or adjusted under 35 U.S.C. 154(b) by 1479 days.

(21) Appl. No.: 11/234,026

(22) Filed: Sep. 23, 2005

(65) Prior Publication Data

US 2007/0073758 A1 Mar. 29, 2007

(51) Int. Cl.
*G06Q 30/00* (2006.01)

(52) U.S. Cl. ................................ 705/26; 705/1; 705/27

(58) Field of Classification Search ................ 705/1, 26, 705/27
See application file for complete search history.

(56) References Cited

U.S. PATENT DOCUMENTS

| | | | | |
|---|---|---|---|---|
| 6,185,558 | B1 * | 2/2001 | Bowman et al. | 1/1 |
| 6,317,722 | B1 | 11/2001 | Jacobi et al. | |
| 6,598,026 | B1 | 7/2003 | Ojha et al. | |
| 6,785,671 | B1 * | 8/2004 | Bailey et al. | 1/1 |
| 6,837,436 | B2 | 1/2005 | Swartz et al. | |
| 6,839,682 | B1 * | 1/2005 | Blume et al. | 705/10 |
| 6,912,505 | B2 * | 6/2005 | Linden et al. | 705/14.53 |
| 7,050,992 | B1 | 5/2006 | Bowman et al. | |
| 7,725,300 | B2 * | 5/2010 | Pinto et al. | 703/2 |

OTHER PUBLICATIONS

"Discovering Similar Resources by Content Part-Linking." Brad Perry, Wesley W. Chu. Computer Science Department, UCLA.*
"Dynamically Discovering Similar Resources in Large-Scale Information Networks" Bradley John Perry, UCLA.*
"Advanced Comparative Shopping Demo," http://www.activeshopper.com/tour.asp?acs=1.
Susan Kuchinskas, "A Toolbar For Comparsion Shoppers," http://www.internetnews.com/ec-news/print.php/3525096, Aug. 4, 2005.
Kristin Huffner, "Interview with Eliron Yaron Of Shelron Group, Inc," http://ericdavid.com/newsletter/mailer/shrn100205.htm, Oct. 2, 2005.

* cited by examiner

*Primary Examiner* — Michael A. Misiaszek
*Assistant Examiner* — Jeffrey A Smith
(74) *Attorney, Agent, or Firm* — X-Patents, APC

(57) ABSTRACT

A method and system is provided that in a fully automated manner crawls web sites and identifies specific types of web pages, then extracts targeted data from those web pages. One or more text nodes containing product-related information on a first web page are first identified, and the locations of those text nodes are described using one or more vectors. The vectors are then analyzed to identify one or more patterns and to generate a model from those patterns that discriminates between text nodes that contain product-related information and text nodes that do not contain product-related information on a second web page. The model can then be used to crawl web sites to identify and extract targeted data, or the model can be installed on a user's computer to identify and extract targeted information from web sites as the user is browsing.

18 Claims, 25 Drawing Sheets

Web Application
Cluster
150

| Your Product History | | |
|---|---|---|
| Show: All Categories [Go]   Show: All [Go] | | Showing 1 - 10 of 500 (Sorted by Most Recently Viewed) |
| Item and Alert information | Available At | Current Price |
| Electronics<br>☐ Canon SD400 Elph Digital Camera<br>Lowest Price Viewed: Amazon.com for $199.99<br>(Set a Price Alert) | 4 Merchants | $189 - $244<br>Save 32%<br>(Compare Prices) |
| Household & Garden<br>☐ 5-Foot Teak Bench<br>Lowest Price Viewed: Amazon.com for $199.99<br>(Edit Alert) | Merchant Name | $189<br>(View Item) |
| Electronics<br>☐ Canon SD400 Elph Digital Camera<br>Lowest Price Viewed: Amazon.com for $199.99<br>(Set a Price Alert) | 5 Merchants | $189 - $244<br>Save 32%<br>(Compare Prices) |
| Household & Garden<br>☐ 5-Foot Teak Bench<br>Lowest Price Viewed: Amazon.com for $199.99<br>(Set a Price Alert) | Merchant Name | $189<br>Coupon<br>(View Item) |
| Electronics<br>☐ Canon SD400 Elph Digital Camera<br>Lowest Price Viewed: Amazon.com for $199.99<br>(Set a Price Alert) | 3 Merchants | $189 - $244<br>Save 32%<br>(Compare Prices) |
| Household & Garden<br>☐ 5-Foot Teak Bench<br>Lowest Price Viewed: Amazon.com for $199.99 | Merchant Name | Item no Longer Available |
| Electronics<br>☐ Canon SD400 Elph Digital Camera<br>Lowest Price Viewed: Amazon.com for $199.99<br>(Edit Alert) | 7 Merchants | $189 - $244<br>(Compare Prices) |
| Household & Garden<br>☐ 5-Foot Teak Bench<br>Lowest Price Viewed: Amazon.com for $199.99<br>(Set a Price Alert) | Merchant Name | $189<br>Coupon<br>(View Item) |
| Household & Garden<br>☐ 5-Foot Teak Bench<br>Lowest Price Viewed: Amazon.com for $199.99<br>(Set a Price Alert) | Merchant Name | $189<br>(View Item) |
| Electronics<br>☐ Canon SD400 Elph Digital Camera<br>Lowest Price Viewed: Amazon.com for $199.99<br>(Set a Price Alert) | 10 Merchants | $189 - $244<br>(Compare Prices) |
| Delete Checked Items (Delete Entire History) | | Prev I 1I2I3I4I5I6I7I8I9I10I Next |

280

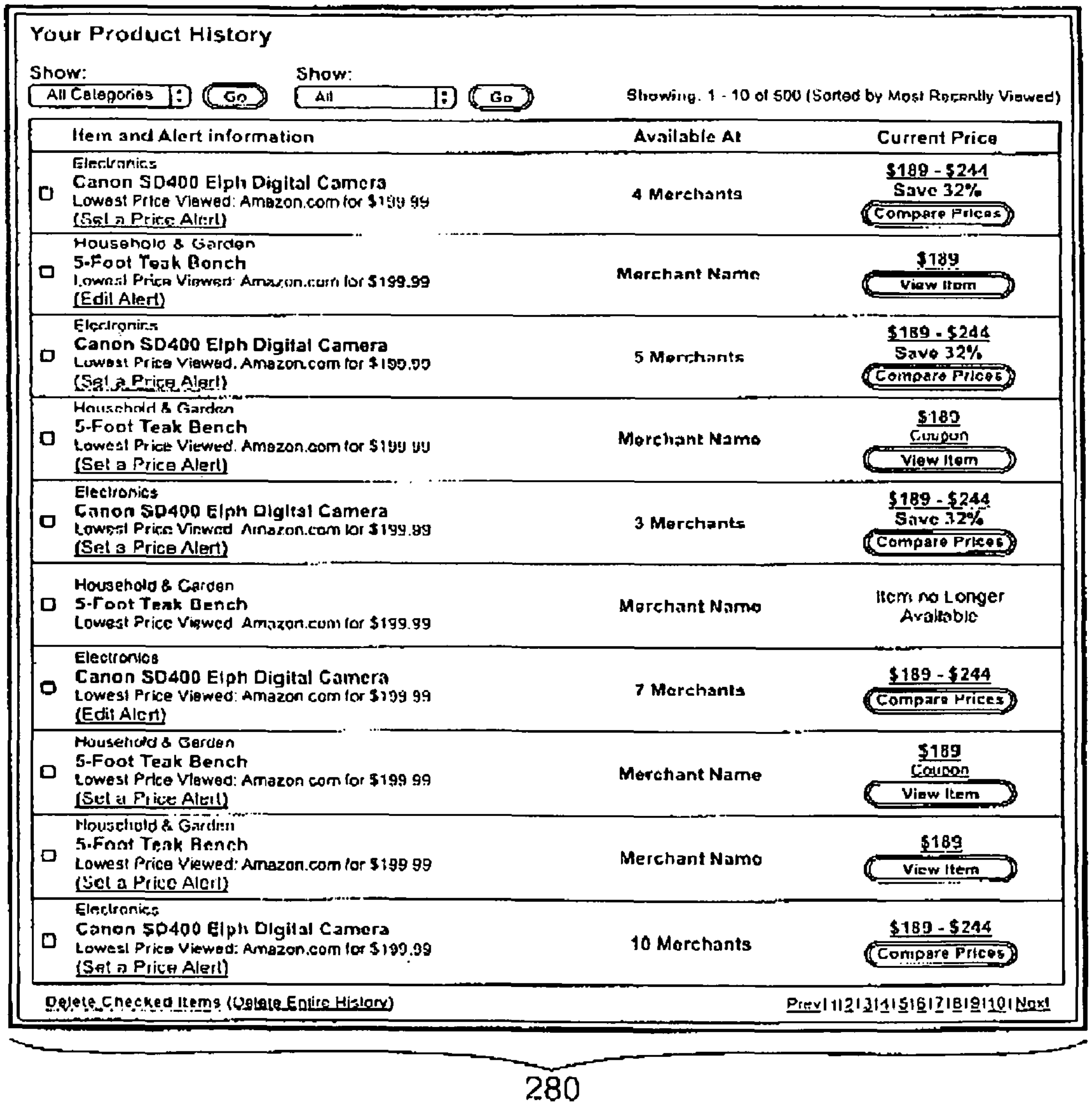

FIG. 14

| Coupon Central | | | |
|---|---|---|---|
| Show: ⌐338 All Categories [Go] | Show: ⌐340 All Merchants [Go] | Sort By: Newest Coupons [Go] | |
| Now showing all coupons in all categories. | | 342 | |

| Merchant ⌐344 | Offer | Expires |
|---|---|---|
| Merchant Logo | Sporting Goods Lorem ipsum dolor sit amet, consectetuer adipiscing elit. (Sed et nunc nec nisl semper hendrerit) | 1 Day 07/15/05 |
| Merchant Logo | Sporting Goods Lorem ipsum dolor sit amet, consectetuer adipiscing elit. (Sed et nunc nec nisl semper hendrerit) More Details | 1 Day 07/15/05 |
| Merchant Logo | Sporting Goods Lorem ipsum dolor sit amet, consectetuer adipiscing elit. (Sed et nunc nec nisl semper hendrerit) | 3 Days 07/15/05 |
| Merchant Logo | Sporting Goods Lorem ipsum dolor sit amet, consectetuer adipiscing elit. (Sed et nunc nec nisl semper hendrerit) More Details | 3 Days 07/15/05 |
| Merchant Logo | Sporting Goods Lorem ipsum dolor sit amet, consectetuer adipiscing elit (Sed et nunc nec nisl semper hendrerit) | 5 Days 07/15/05 |
| Merchant Logo | Sporting Goods Lorem ipsum dolor sit amet, consectetuer adipiscing elit. (Sed et nunc nec nisl semper hendrerit) | 7 Days 07/15/05 |
| Merchant Logo | Sporting Goods Lorem ipsum dolor sit amet, consectetuer adipiscing elit. (Sed et nunc nec nisl semper hendrerit) More Details | 11 Days 07/15/05 |
| Merchant Logo | Sporting Goods Lorem ipsum dolor sit amet, consectetuer adipiscing elit. (Sed et nunc nec nisl semper hendrerit) | 14 Days 07/15/05 |
| Merchant Logo | Sporting Goods Lorem ipsum dolor sit amet, consectetuer adipiscing elit. (Sed et nunc nec nisl semper hendrerit) More Details | 14 Days 07/15/05 |
| Merchant Logo | Sporting Goods Lorem ipsum dolor sit amet, consectetuer adipiscing elit. (Sed et nunc nec nisl semper hendrerit) | 14 Days 07/15/05 |

Showing: 1-10 of 66 results (Sorted by Best Match)   Prev |1|2|3|4|5|6|7|8|9|10| Next

Most Popular Coupons

Amazon.com
Free Shipping on all orders of $200 or more
(Excludes all items in Computers and Software)

Amazon.com
$10 off $50 in Electronics

Amazon.com
Free Shipping on all orders of $200 or more
(Excludes all items in Computers and Software)

Amazon.com
Free Shipping on all orders of $200 or more
(Excludes all items in Computers and Software)

Amazon.com
$10 off $50 in Electronics

326

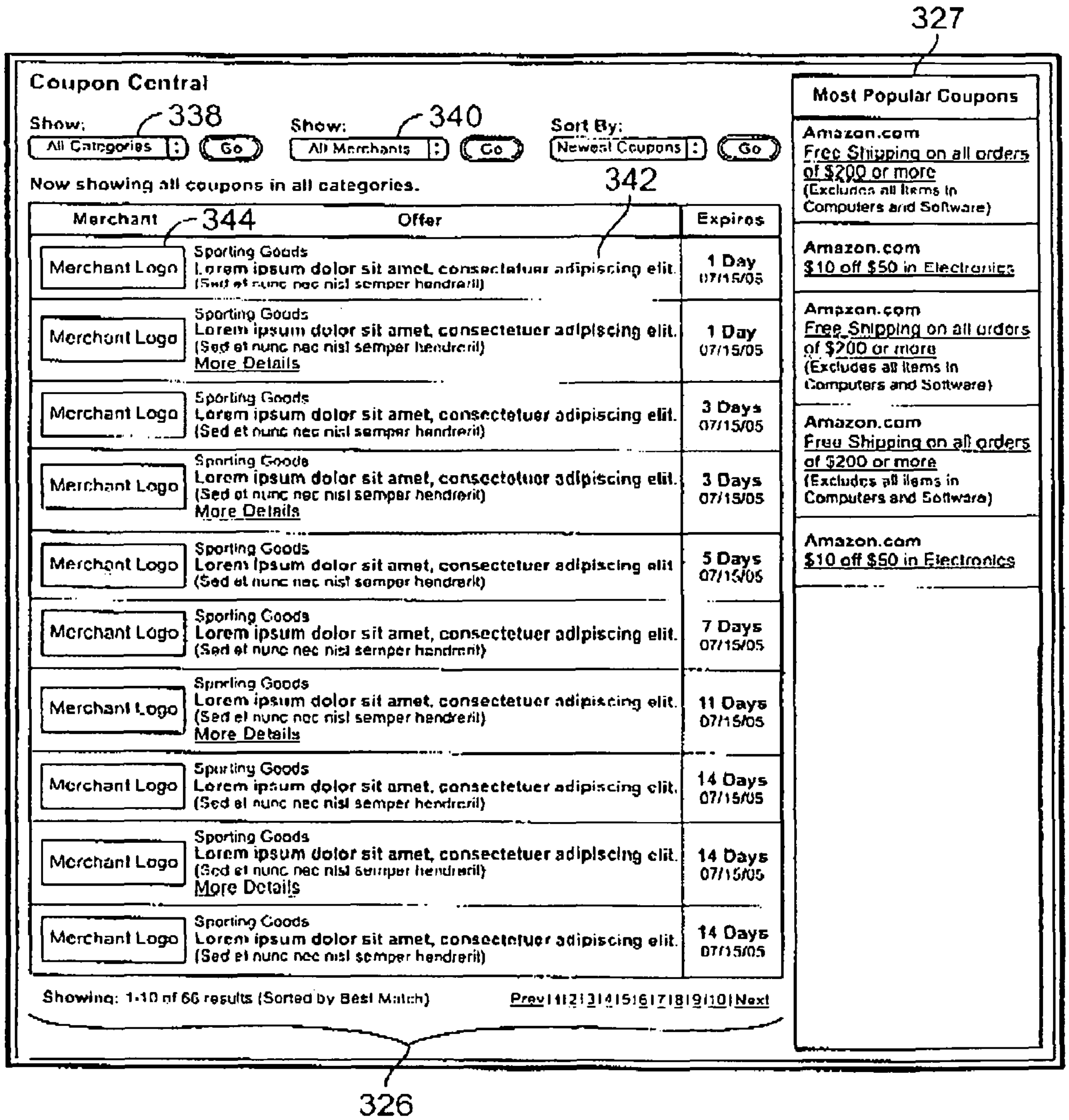

FIG. 18

METHOD AND SYSTEM FOR IDENTIFYING PRODUCT-RELATED INFORMATION ON A WEB PAGE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND OF THE INVENTION

1. Field of the Invention

The invention relates generally to the field of crawling and modeling Internet web pages. In particular, the invention relates to a method and system for identifying targeted data on a web page.

2. Description of Related Art

Computer networks, particularly the Internet, provide increasingly important markets for goods and services. Currently, the Internet extends to millions of computers in more than a hundred countries. One service that uses the Internet is the World Wide Web (the "Web"). The Web is a system of Internet servers that support documents formatted in a markup language called HyperText Markup Language ("HTML"). A huge number of Web servers support HTML documents, commonly referred to as web pages, containing various types of information including text, graphics, video, and audio files. Typically, web pages are viewed on computers using web browser software, e.g., NETSCAPE NAVIGATOR or MICROSOFT'S INTERNET EXPLORER; however, web pages may also be accessed by other devices, such as personal digital assistants, mobile phones, etc.

Various technological developments have given rise to tremendous growth in the use of the Internet generally, and the Web in particular. These developments include the increased availability of both commercial and residential high-speed Internet connections, improvements in the capabilities of browser and server software, improvements in search services that allow users to quickly identify sources of useful information, and the dramatic increase in the amount of information that is available to users. As a result, a large and vibrant Web-based marketplace has emerged.

This marketplace provides consumers with a level of shopping transparency that was previously unavailable. Particularly in the retail sector, multiple merchants often offer the same or similar products such that consumers can find the same product available for sale on several different retail web sites. In this environment, consumers can compare pricing and other relevant factors by looking at retail web sites, without physically visiting multiple stores.

However, the process of comparative shopping by viewing individual web sites can itself be time consuming and inexact. Moreover, existing efforts to simplify online comparative shopping have significant drawbacks. Known examples of comparative shopping systems, such as those found at the web sites www.shopping.com and www.shopzilla.com, require the consumer to first identify a product of interest, then go to a dedicated web site and enter specific information about the product to obtain information about alternative sources of that product. None of the current systems provide a fully automated solution. The present invention satisfies this need.

SUMMARY OF INVENTION

A method and system is provided that in a fully automated manner crawls web sites and identifies specific types of web pages, then extracts targeted data from those web pages. An exemplary method according to the invention is a method for identifying product-related information on a web page. One or more text nodes containing product-related information on a first web page are first identified, and the locations of those text nodes are described using one or more vectors. The vectors are then analyzed to identify one or more patterns and to generate a model from those patterns that discriminates between text nodes that contain product-related information and text nodes that do not contain product-related information on a second web page.

In other more detailed features of the invention, the first and second web pages are written using HTML programming language and the vectors are 4-place vectors in which one field of the vectors represents the text of the text node, one field of the vectors represents the anonymous HTML tag path leading to the text node, one field of the vectors represents the indexed HTML tag path leading to the text node, and one field of the vectors represents the attribute-annotated HTML tag path leading to the text node.

In other more detailed features of the invention, the model includes one or more symbolic expressions that represent the pattern of text node locations, and the model is used to crawl a plurality of web pages to identify and extract product-related information. The model can also be provided to a client application on a user's computer and used to identify and extract product-related information from web pages as they are displayed to the user.

Embodiments of the present invention also include a system having a first computer having a first computer-readable medium containing a copy of source code for a first web page, and one or more first computer programs configured to parse the copy of the source code to identify all text nodes and analyze the text nodes to identify any text nodes that contain product-related information. One or more second computer programs are configured to generate vectors describing the location of the text nodes containing product-related information, analyze one or more of the vectors to identify one or more patterns and generate one or more models that discriminate between text nodes that contain product-related information and text nodes that do not contain product-related information on a second web page. A second computer is coupled to the first computer and has a second computer-readable medium. One or more of the models are transmitted to the second computer, stored in the second computer-readable medium, and used to identify and extract information about one or more products available for sale on one or more merchant web pages.

In other more detailed features of this system, the web pages are written using HTML programming language, and the vectors are 4-place vectors where one field of the vectors represents the text of the text node, one field of the vectors represents the anonymous HTML tag path leading to the text node, one field of the vectors represents the indexed HTML tag path leading to the text node, and one field of the vectors represents the attribute-annotated HTML tag path leading to the text node. In other more detailed features of the invention, the model includes one or more symbolic expressions that represent the pattern of text node locations, and the model is used to crawl web pages to identify and extract product-related information.

Another exemplary method according to the invention is a method for generating a model to identify product-related information on a web site. First, potential product-related text nodes are located on a first web page. Then a representation space is created that describes the potential product-related text nodes on the first web page; and this representation space is analyzed to identify one or more patterns. Those patterns are then used to generate one or more models that discriminate between product-related text nodes and non product-related text nodes on a second web page.

Other features of the invention should become apparent from the following description of the preferred embodiments taken in conjunction with the accompanying drawings, which illustrate, by way of example, the principles of the invention.

BRIEF DESCRIPTION OF THE DRAWINGS

FIG. 14 is a diagram of an exemplary price comparison grid history page according to one embodiment of the invention.

FIG. 18 is a diagram of an exemplary coupon management web page according to one embodiment of the invention.

DETAILED DESCRIPTION OF THE PREFERRED EMBODIMENTS

The following description is presented to enable any person skilled in the art to make and use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

Figure 1:
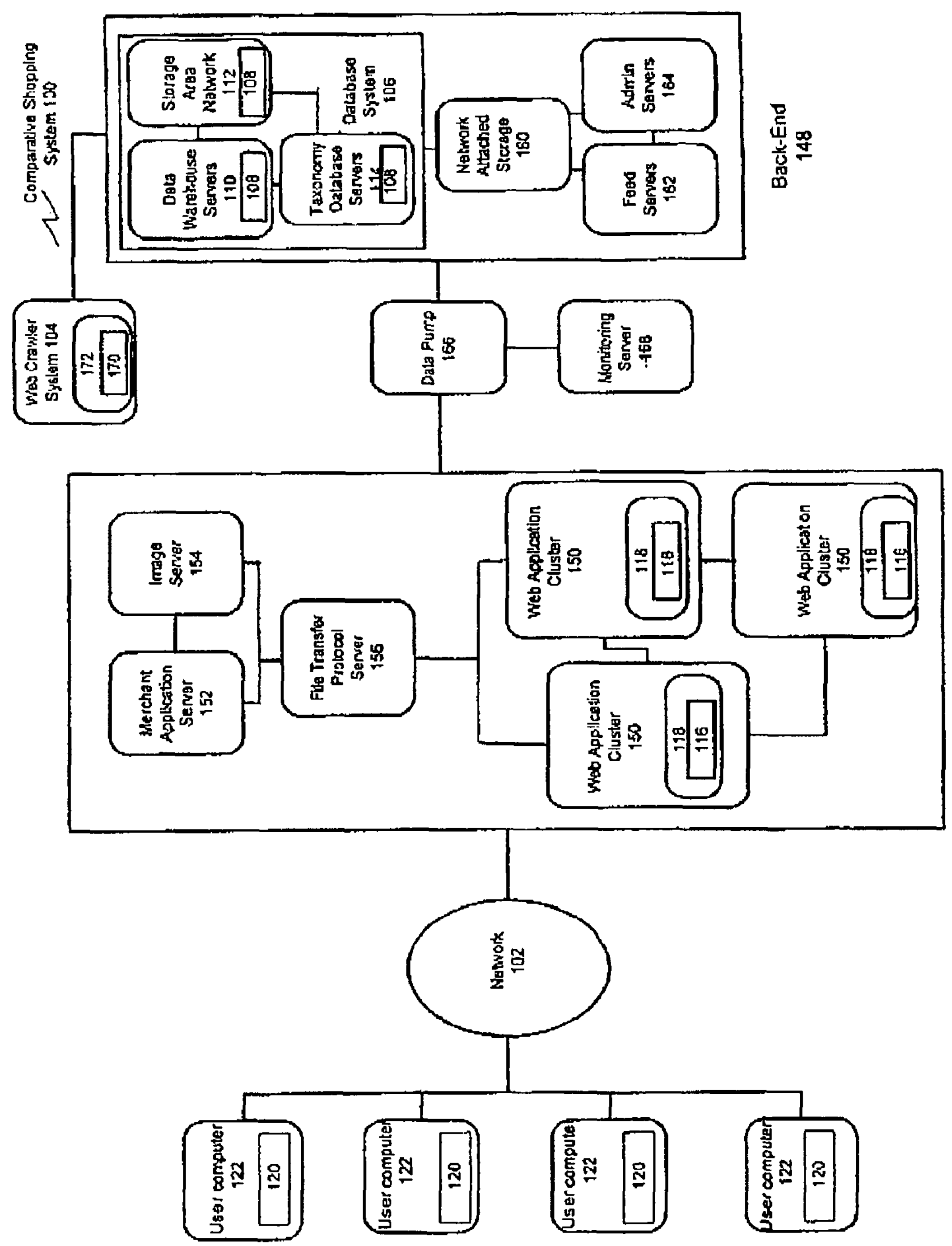
FIG. 1 is a diagram of a general architecture according to one embodiment of the invention.

Referring to FIG. 1, the comparative shopping system 100 according to the present invention provides a highly automated comparative shopping experience for users, who can simply browse the network 102 for products of interest. The system dynamically identifies products of interest to the user, and provides comparative pricing information, as well as additional information of value to the consumer's purchase decision, in real time. Relevant elements of the system will now be described in greater detail. For clarity, the overall comparative shopping system disclosed herein will first be described very generally in terms of its basic functional characteristics. Specific relevant features of the system and methods employed by the system will then be described in more detail.

Overview of Comparative Shopping System

In one embodiment, the present invention provides users with an integrated electronic shopping assistance and price comparison system 100 as illustrated in FIG. 1. The system includes a web crawler system 104, a database system 106 containing merchant and product-related information stored on a first recording medium 108 on one or more servers 110, 112, and 114, a web-based software application stored in a second recording medium 116 on one or more web-application servers 118, and a client application program stored in a plurality of third recording media 120 on a plurality of user computers 122. The web crawler system is coupled to the database system. The database system is coupled to the web-based application servers, and the web-based application servers are coupled to the user computers via a network 102, such as the Internet.

Figure 2:
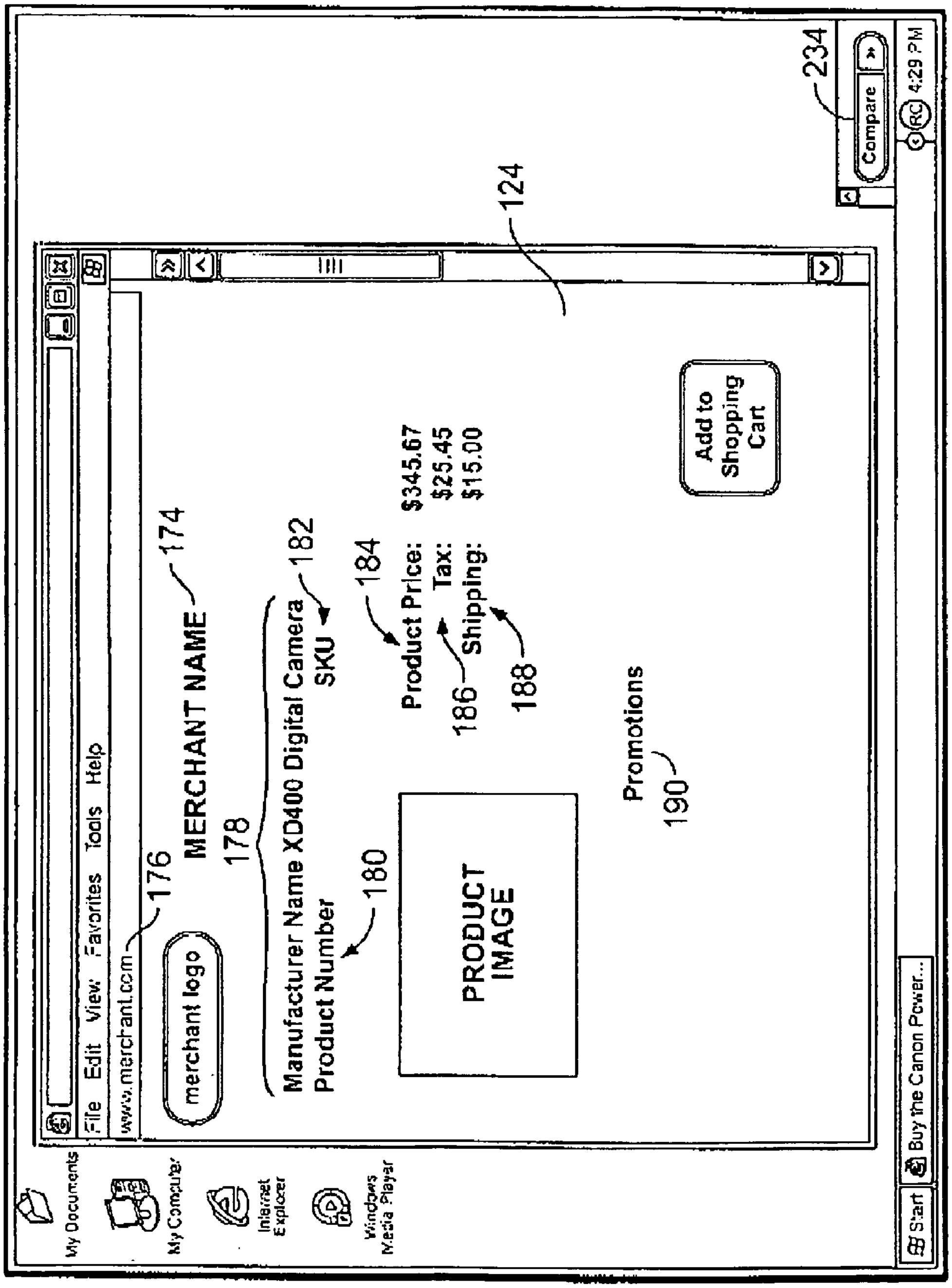
FIG. 2 is an diagram of an exemplary product detail web page.

In one embodiment, users typically access the system through the client software application installed on their user computer 122, although the system can also be configured to provide access via a web-based application server 118. The client application is a computer program that, once installed on a user's computer, gathers information regarding web pages called by that computer. As the user's computer displays web pages, the client application uses a set of merchant models (discussed in greater detail below) to identify those web pages containing information regarding consumer products that are being offered for sale. Such pages will be referred to herein as product detail pages. FIG. 2 illustrates an example of a product detail page 124.

It will be understood by those of ordinary skill in the art that a user computer 122 can be a personal computer, workstation, personal digital assistant, cellular or other mobile phone, television, or any other digital device that can access a network and view merchant web sites or similar virtual retail outlets in whatever form they may take in the future. Similarly, the term server as used herein refers broadly to a class of computers in use today, but also encompasses any form of digital storage and processing device that may fulfill the same role in a networked environment. These and other references to contemporary digital devices are used by way of example rather than limitation, and are to be construed broadly to encompass technological developments.

A product detail page 124 displaying a product to a user will be referred to herein as an anchor page. When the client application identifies a product detail page, it extracts specific information about the product, such as product title 126, product number 128, price 130, etc. The client application can also collect other information from the anchor page, and sends the extracted data to the web-based application.

The web-based application has access to an extensive database system 106 of merchant and product information. Much of the information in the database system is compiled and verified by the web crawler system 104. Since web pages containing product information, such as product detail pages 124, constitute only a limited portion of the total number of web pages that are displayed on any given merchant web site, the web crawler is programmed to identify potential product detail pages as well as product index pages that contain links to product detail pages. The web crawler stores these potentially relevant pages on a fourth recording medium 132 on a web crawler server 134 for detailed crawling, and then extracts the relevant product data from those pages and sends it to the database system.

Merchant and product data is stored in the database system 106. Products in the database system that are available from multiple merchants will be referred to herein as "golden products." Products in the database system that are available from only one merchant will be referred to as "unique" or "non-commodity" products.

When product data from an anchor page is passed from the client application running on the user's computer 122 to the web-based application running on the web-based application servers 118 via the network 102, the product data is formatted and compared to entries in the database system 106 to determine whether it matches any known products. The anchor product can be an exact match or a close substitute for a golden product or a unique product, or it may not match at all. If the anchor product is an exact match or a close substitute for a golden product, the web-based application passes data to the client application, which then serves a notification message to the user informing the user that the anchor product or a similar product is available from a different merchant. If the anchor product is an exact match with a non-commodity product, different types of notification messages may be served, such as promotional offers or information regarding related products.

Figure 3:
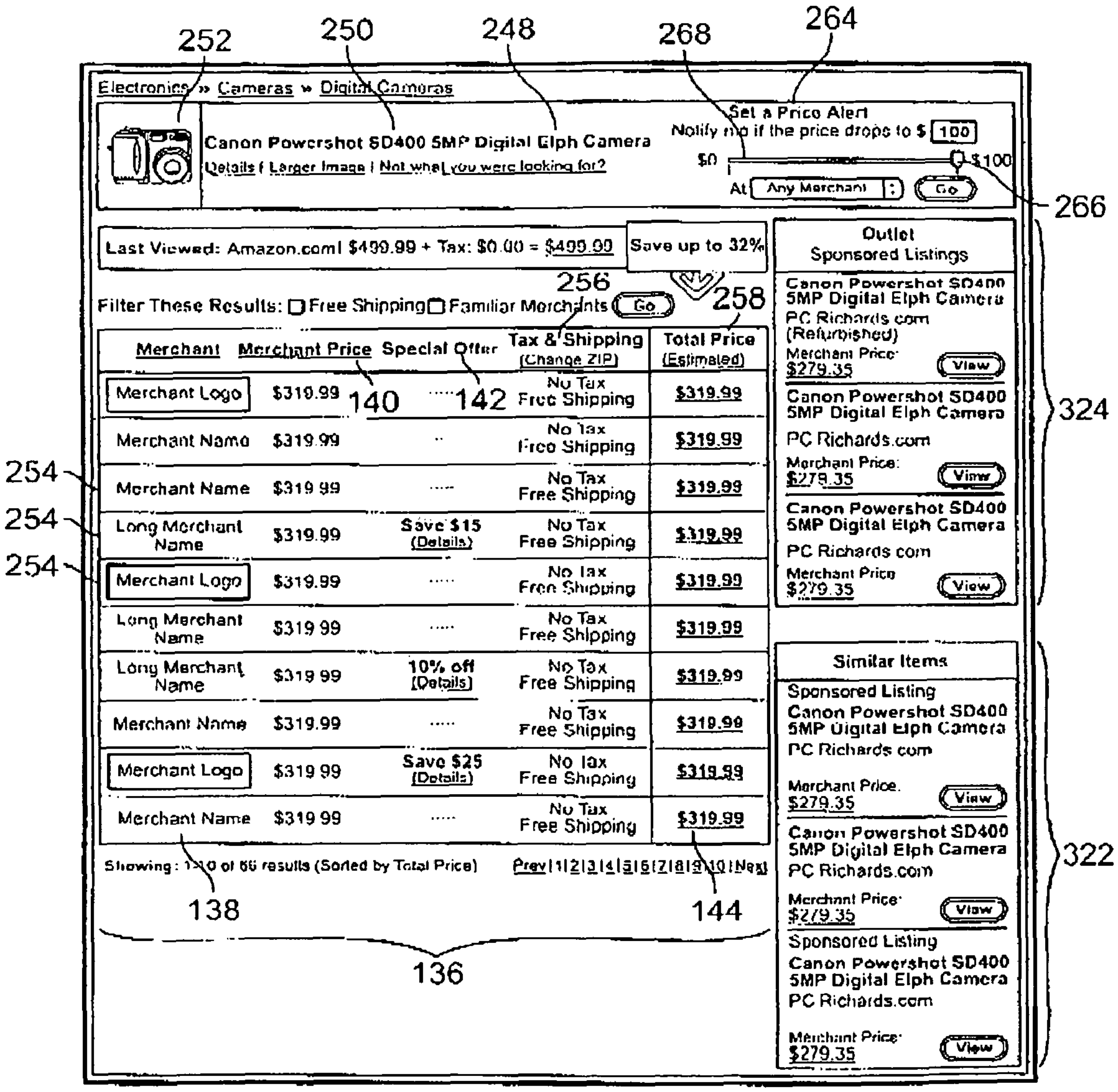
FIG. 3 is a diagram of an exemplary price comparison grid as it would be displayed on a user's computer according to one embodiment of the invention.

The notification message to the user may contain one or more links to additional information about available promotions and products that match or are close substitutes for the anchor product. Referring to FIG. 3, in one embodiment the notification includes a link to a price comparison grid 136 that shows the names of the merchants 138 that offer the matching product, pricing information 140 and promotions 142 in a sorted list. The price comparison grid contains links 144 to the listed merchant sites so that the user can quickly and easily purchase the product from a selected merchant.

Figure 4:
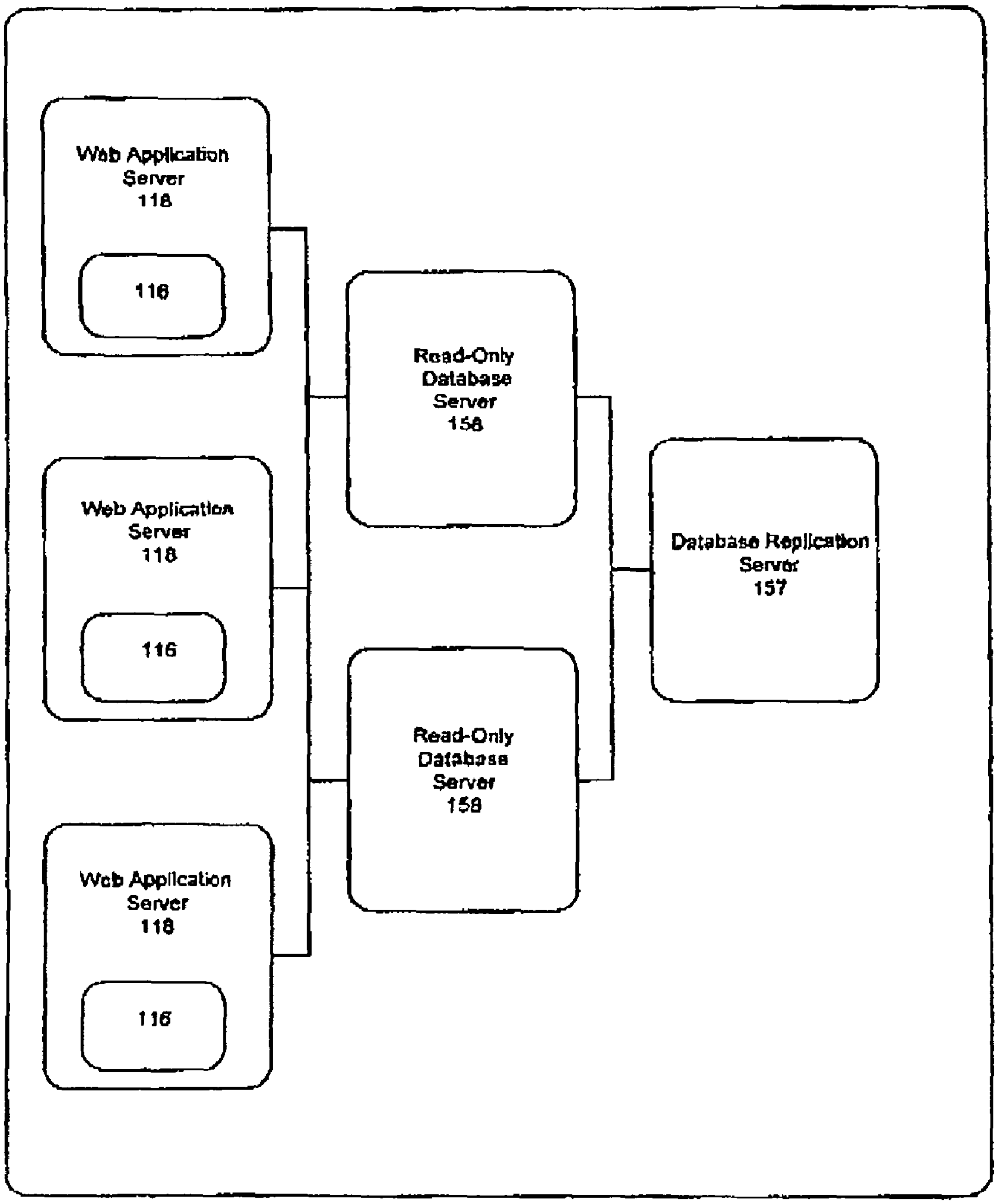
FIG. 4 is a diagram of a general architecture of a web-based application cluster according to one embodiment of the invention.

Referring to FIG. 1, the primary components of one embodiment of the system can be conceptually divided into a front-end 146 and a back-end 148. The front-end includes the web-application clusters 150, merchant application servers 152, image servers 154, and file transfer protocol servers 156. The web-based application clusters pass along information from, and serve information to, the client applications stored on user computers 122. As illustrated in FIG. 4, the web-based application clusters can include data replication servers 157, read-only database systems 158 to improve system efficiency, and web-based application servers 118.

The back-end 148 stores, maintains and processes data from various sources, including the web crawler system 104 and the user computers 122. The back-end includes a database system 106, consisting of interconnected data warehouse servers 110, taxonomy database system servers 114, and storage area network servers 112, as well as interconnected network attached storage servers 160, feed servers 162 and administrative servers 164. The back-end is connected to the front-end 146 by dedicated data pump servers 166 and data monitoring servers 168. However, this embodiment reflects just one way of structuring the system. It will be understood by those of ordinary skill in the art that the system can be structured in a wide variety of ways, with different elements of the system performing different functions consistent with the inventions disclosed herein.

The system's database system 106 of merchant and product information is a commercially available, standard, transactional relational database system such as an ORACLE database system, that will be familiar to those of ordinary skill in the art. The database system maintains records including without limitation: lists of known merchants; lists of merchant products; golden product titles and related information; unique product titles and related information; merchant promotions; manufacturer promotions; user information; passive alerts; active alerts; and merchant product page models. The contents of the database system are transferred to the front-end 146 using the data pump servers 166 and are replicated in read-only database servers 158 clustered with the web-based application servers 118.

Web Crawler System

The web crawler system 104 includes a set of computer programs stored in recording media 170 on servers 172 that retrieve, analyze, and extract data from web pages. In one embodiment, the web crawler system provides the extracted data to the back-end 148 of the system for processing and entry in the database system 106. Web crawlers are generally used to locate web pages by content or by following hypertext links from page to page. While prior art web crawlers typically crawl and extract data from web pages relatively indiscriminately, the web crawler of the current invention is programmed to quickly discriminate relevant web pages for data identification and extraction.

In one embodiment, the web crawler system 104 uses a decentralized, broker-based approach to efficiently gather merchant and product data. A decentralized crawler program is distributed across multiple servers 172 so that no single server crawls an entire web site. A broker program distributes the web pages among the servers so that each web site is crawled on a plurality of servers.

The web crawler system 104 rarely performs a general, all pages crawl typical of Internet search engines. Instead, it uses different types of crawls to seek different types of information. Since the specific types of data sought by the crawler, such as product prices, are found on particular types of pages, the crawler first identifies candidate web pages that are likely to contain the data of interest. Particular types of web pages, for example product detail pages 124 and product index pages, are not inherently distinct from other types of web pages, so the crawler must be able to efficiently discriminate candidate pages. This is done using a heuristic model in which the crawler compares web pages against taxonomies of anticipated concepts and layout templates commonly associated with the type of page that is sought.

For example, in one embodiment the web crawler uses such a heuristic model to identify potential product index pages on merchant web sites. This heuristic model first compares the text and uniform resource locator ("URL") of each link on a web page to specific taxonomies to identify those that lead to product detail pages 124. The text of the link is compared to a taxonomy of text strings that typically are not used in links to product detail pages, while the URL is compared to a taxonomy of URL text strings that typically are not used in URLs for product detail pages. If the text of a link or the URL does not match with a text string in the applicable taxonomy, the link is considered a potential product-oriented link.

The text of the potential product-oriented link is then further compared against a set of patterns. For example, one pattern may be the use of the words "next page" or "see more" in the text of the link. If there is a match with a pattern, the link is considered a product index link. Finally, the web page served from that link is compared with a taxonomy of layout templates that reflect typical product index page layouts to determine whether or not it displays distinct product or price data. If the web page has more than one point where it displays product or price data, it is considered a probable product index page. Probable product index pages identified by this heuristic model are copied to a server for further analysis, modeling and data extraction. A similar process can be used to identify product detail pages 301.

The further analysis, modeling and data extraction is performed using what will be referred to herein as a matcher. A matcher is computer program stored in a recording medium 170 on a server 172 that analyzes web pages to match the locations of a specific type of data on a web page to a taxonomy of target concepts or a taxonomy of layout templates. For example, a matcher for product title data takes as input a taxonomy of reference product titles and a set of web pages from a merchant web site. The output of this analysis is a key to every location on those web pages where the reference product titles are listed. This information is then used to generate a model that locates and extracts product titles from that merchant's web pages.

In one embodiment, the matcher uses 4-place, context-feature signatures to create a theoretical representation space that describes the locations of the relevant data on an HTML-based web page. The web page to be modeled is first analyzed using a computer program stored in a recording medium on a server that parses the HTML source code document to identify all text nodes. A text node is a location in the HTML code that causes text to appear in a specific location when the page is displayed using a web browser.

In this embodiment the parsing program then generates 4-place context feature signatures that describe each text node. The 4-place context feature signatures use the following construction:

```
actual-text | structured-path | indexed-path | annotated-path
```

The actual-text field is the actual text content of the text node. The structured-path field is the anonymous HTML tag path leading to the text node. The indexed-path field is the indexed HTML tag path leading to the text node. Finally, the annotated-path field is the attribute-annotated HTML tag path leading to the text node.

In one embodiment, the parsing program operates on HTML documents as indicated in the following code:

```
my $p = com::sd::parse::HTMLText->new( );
$p->clear( ); # clear the parser of past state
$p->parse_file( $html_file ); # parse an HTML file
# get an array of the text nodes in the HTML doc. Each
# element of the array contains the text and 3 hpath
# signatures of the text node.
my @tns = $p->getText nodes( );
```

The parsing process effectively collapses the HTML document that represents the web page into a linear array of 4-place, context-feature signatures that individually describe each text node, and collectively describe the web page.

For example, a simple HTML document may consist of the following HTML code:

```
<html>
<p>A list of products we offer:
<table border>
<tr>
<td width="60%"><span class="title">Nikon D-100
<td width="20%"><span class="price">$1,499
<td>in stock
</tr>
<tr>
<td width="60%"><span class="title">Kodak Easyshare cx7300
<td width="20%"><span class="price">$499
<td><a href="http://www.kodak.com">details</a>
</html>
```

This HTML code results in the display of the following when viewed on a user's web browser:

A list of products we offer:

| | | |
|---|---|---|
| NIKON D-100 | $1,499 | in stock |
| KODAK EASYSHARE cx7300 | $499 | details |

Running a parsing program on this HTML document would generate the following 4-place, context-feature signatures describing the text nodes:

```
A list of products we offer:
document.html.p:0
document:0.html:0.p:0
document.html.p
NIKON D-100
document.html.p.table.tr.td.span:0
document:0.html:0.p:0.table:0.tr:0.td:0.span:0
document.html.p.table[border=border].tr.td[width=60%].span[class=title]
$1,499
```

-continued

```
document.html.p.table.tr.td.span:1
document:0.html:0.p:0.table:0.tr:0.td:0.span:1
document.html.p.table[border=border].tr.td[width=20%].span[class=price]
in stock
document.html.p.table.tr.td:0
document:0.html:0.p:0.table:0.tr:0.td:0
document.html.p.table[border=border].tr.td
KODAK EASYSHARE cx7300
document.html.p.table.tr.td.span:2
document:0.html:0.p:0.table:0.tr:1.td:0.span:0
document.html.p.table[border=border].tr.td[width=60%].span[class=title]
$499
document.html.p.table.tr.td.span:3
document:0.html:0.p:0.table:0.tr:1.td:0.span:1
document.html.p.table[border=border].tr.td[width=20%].span[class=price]
details
document.html.p.table.tr.td.a:0
document:0.html:0.p:0.table:0.tr:1.td:0.a:0
document.html.p.table[border=border].tr.td.a[href=http://www.kodak.com]
```

Considering the last example in this string of context feature signatures, the actual text contained in the text node represented by this signature is "details." The other fields of this signature are expressed as tag paths. For example the structured-path field showing the anonymous HTML tag path leading to the text node is "document.html.p.table.tr.td.a:0." This indicates that the text "details" is inside of an "a" tag, which is inside of a "td" tag, which is inside of a "tr" tag, etc. The indexed-path, sometimes referred to as an xpath, is "document:0.html:0.p:0.table:0.tr:1.td:0.a:0." Finally, the annotated-path, which is essentially the structured-path with annotations included, is "document.html.p.table[border-border].tr.td.a[href=http://www.kodak.com]." The linear array of these 4-place context feature signatures provides a detailed description of the layout of the web page.

The matcher then analyzes the arrays of context feature signatures for each type of web page that it is modeling to identify patterns that explain the relevant page layout and context features. A pattern is output as a regular expression or substring that matches the context feature signatures or groups of context feature signatures of the relevant text nodes, but does not match irrelevant text nodes. An example is a Practical Extraction and Report Language ("PERL") programming language regular expression. PERL regular expressions are a syntax, implemented in PERL and certain other programming environments, that simplifies complex string comparisons, selections, and replacements, and facilitates parsing based on these abilities.

This analysis of the context feature signatures can be done in the 4-place representation space defined by the 4-place context feature signatures. However, in many cases the analysis can be improved by mapping the 4-place context feature signatures to a higher dimensional representation space to increase the precision of the match. For example, in one embodiment the product title matcher maps the 4-place context feature signature for each product title text node to seventeen (17) context feature vectors. These seventeen context feature vectors summarize the syntactic (i.e., layout) and semantic (i.e., language) context where the product title occurs. For example, a context feature vector may indicate whether or not the text in the node is a link, and output a corresponding binary positive or negative indicator. Another context feature vector may count the number of the header tag and output it as a number.

The matcher then analyzes the seventeen context feature vectors for all of the product titles on a merchant web site to identify patterns. This analysis generates a match model for that merchant web site that describes the locations of product titles as distinguished from general prose or other text on a web page. The matcher then further analyzes the context feature vectors for all of the pages on the web site using the match model, and selects the product titles that are in the most similar layout. These product titles are considered to be the actual product title matches for the web site.

The matcher can also assign confidence measures to each product title match, reflecting the accuracy of the match. For example, the 17-place context feature vector that represents each product title can be viewed as defining a cluster in the 17-place vector space. The accuracy of each selected title is determined by its distance from the center of the cluster, calculated as a Euclidean distance between two vectors. This accuracy can be translated into a confidence measure.

In addition, the crawler system 104 can use a variety of other matchers to create match models for other types of data such as addresses, shipping costs, taxes, etc. Each matcher can operate directly with the 4-place context feature signatures, or map those signatures to a higher dimensional representation space. For example, the product/price matcher can be used to identify all locations on a merchant's web pages where product/price data is displayed. In one embodiment this matcher maps the 4-place context feature signatures to eleven (11) context feature vectors. Each matcher may use different context feature vectors, and different numbers of context features, depending on the type of information targeted.

The match model's determinations regarding which pages are product detail pages 124 are also used to classify the locally stored web pages as either "positive URLs" or "negative URLs." Positive URLs are those web pages that are either product detail pages or product index pages, and negative URLs are all other pages. A computer program stored in a recording medium 170 on a server 172 then analyzes the list of positive URLs to identify patterns that can be used to identify product detail and product index pages for that merchant. Given a set of URLs marked as positive and negative, this analysis generates a URL model that matches against positive URLs without matching against negative URLs.

In one embodiment, the computer program that performs this analysis is a PERL module that takes as input a file that includes a list of URLs in the form:

```
(pos/neg)|URL
An actual example of a listing would be:
pos|http://www.danceweardeals.com/Merchant2/merchant.mvc?Screen=
PROD&Store_Code=DD&Product_Code=DS07&Category_Code=H
```

This computer program analyzes all candidate URLs in the input file, and outputs a URL model for that merchant that describes the positive URLs and not the negative URLs, together with data regarding the precision, recall and sample size used to determine the signature. An example of the output from this module would be:

```
v.95.95|strongpairs=key:Product_Code ::
suffix:merchant.mvc|0.97537|1.00000|99
```

The fields shown in this example are as follows:

```
label | solution | precision | recall | number of URLs
```

The label field can be used for any internal label. The solution field is the model that describes the positive URLs but not the negative URLs for that merchant, expressed symbolically. The precision field is calculated for the model reflects the likelihood that it will correctly determine whether a previously unseen page is a product detail or index page. The recall field represents the coverage of the model, such that a recall of 1.0 means that the model has worked on every positive URL that has been encountered. The model output by this computer program is the URL model for that merchant web site.

Once a match model and URL model have been developed for a particular merchant web site, the two models are used by the web crawler system 104 to quickly and accurately identify and extract relevant data from the product detail pages 124 and product index pages, including without limitation: (1) the merchant name 174; (2) the URL for the page 176; (3) the title of the product 178; (3) the make and model of the product 180; (4) the SKU for the product 182; (5) the price of the product 184; (6) tax 186 and shipping charges 188; and (7) any promotions that apply to the product 190. The relevant extracted data is then sent to the back-end 148 servers for processing, and appropriate portions of the data are stored in the database system 106.

Figure 5:
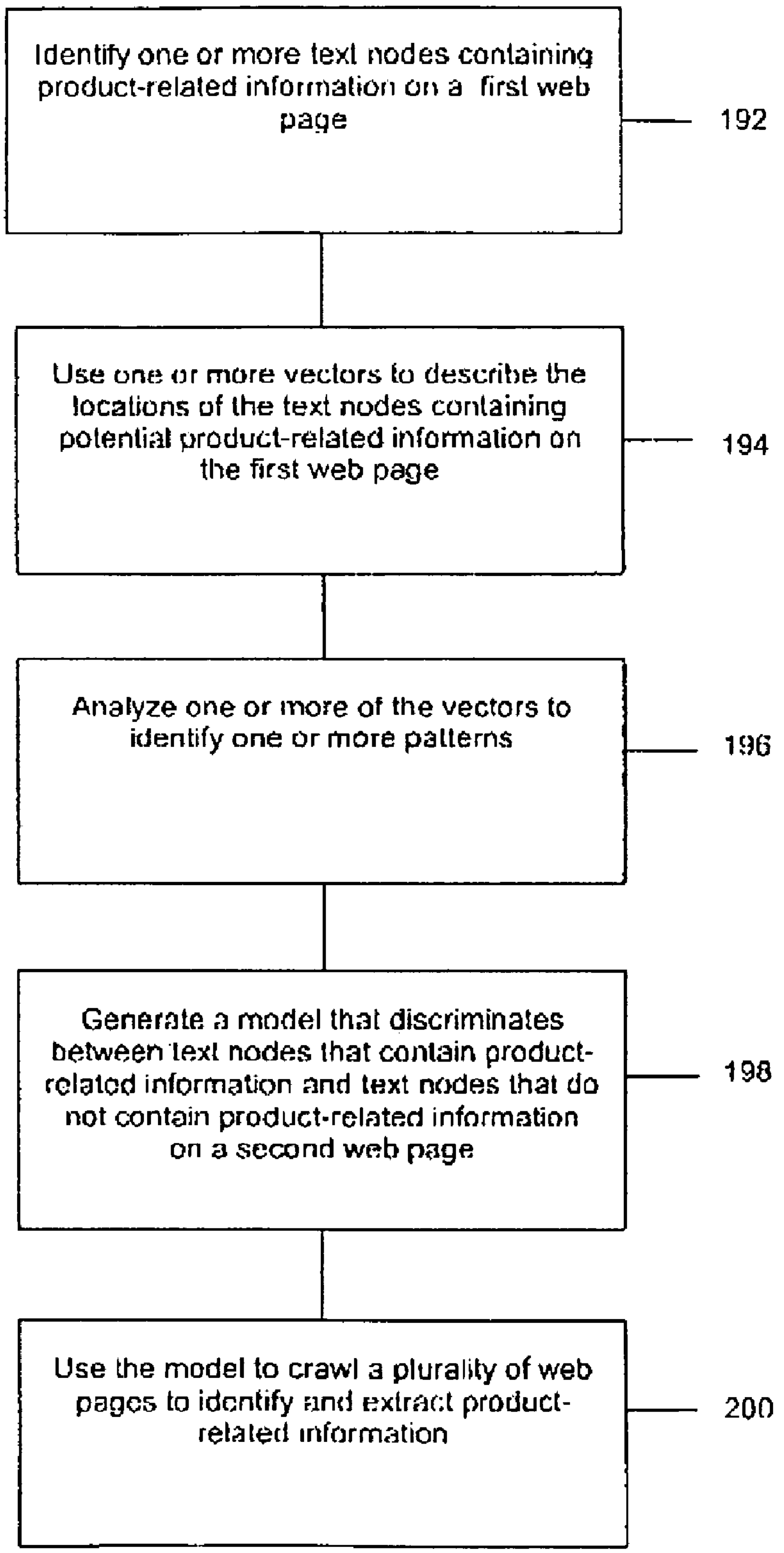
FIG. 5 is a flow chart indicating the steps of the process of crawling web pages to identify and extract product-related information according to one embodiment of the invention.

Referring to FIG. 5, in one embodiment the first step 192 of the process for identifying and extracting product-related information on a web page is to identify one or more text nodes containing potential product-related information on a first merchant web page. In the second step 194 one or more vectors are used to describe the location of the text nodes that contain potential product-related information on the first merchant web page. In the third step 196 the vectors are analyzed to identify patterns in the locations of the potential product-related information. In the fourth step 198 those patterns are used to generate a model that discriminates between text nodes that contain product-related information and those that do not contain product-related information on a second web page. In the fifth step 200, the model is used to crawl a plurality of web pages to identify and extract product-related information.

Merchant Models

In one embodiment, the match model and URL model for each merchant web site are also used to create a set of separate, simplified merchant models that can be loaded to the client application to analyze web sites as they are viewed by the user. The purpose of merchant models is two-fold: (1) to identify product detail pages 124 and extract relevant information; and (2) to identify coupon or promotion fill pages and the HTML node to insert a coupon or promotion. Like the match models, the client merchant models use a 4-place feature context feature representational space.

Client merchant models generally include three core components: (1) one or more page models; (2) extraction rules by page type; and (3) validation rules. The page models are used by the client application to determine whether the client is viewing a useful web page such as a product detail page 124, check-out page, sales confirmation page, etc. The extraction rules control the extraction or insertion of data to and from the web page based on the type of page the user is viewing. The validation rules are used to verify that the extraction rules are operating properly in extracting valid target data.

The client merchant models are written in Extensible Markup Language ("XML") or another appropriate programming language, and are interpreted by the client application as a series of rules. In one embodiment, the merchant models adhere to the following schema:

```
<Model site="<string> [r]"
    <rule
        name="<string> [r]"
        priority="<integer> [r]"
        parser="<string> [o, 'htmlfull']"
        activate:url="<regex> [r]"
        activate:content="<regex> [o]" >
        <fspec
            name="<string> [r]"
            content="<regex> [o, '.']"
            spath="<regex> [o, '.']"
            ipath="<regex> [o, '.']"
            apath="<regex> [o, '.']"
            extract="<regex> [o, '^ (.+)$']"
            extractfields="<integer list> [o, 1]" >
        <constraint
            fields="<string>,<string> [r]"
            distance:min="<integer> [o, '0']"
            distance:max="<integer> [o]" >
    </rule>
    ...
<Model/>
```

Within this schema, the "site" is the specific merchant domain that is the subject of the model. A "rule" is used to extract arbitrary named fields from the target HTML document. When a rule is applied, the system captures the field values from that HTML document in accordance with the field specifications that make up the rule.

The attributes of a rule in this schema are as follows. The "name" is the name of the rule. The "priority" is the integer-valued firing priority for the rule. The "parser" refers to the computer program that is used to parse the text nodes of the HTML document. The "activate:*" attribute sets the firing conditions upon with the rule should be tested against the page contents. The "activate:url" attribute is the model that is to be evaluated against the URL of a document. The "activate: content" attribute is an optional attribute used to determine whether the HTML document is a product detail page 124 based on the content of the document.

The field specifications that make up each rule are the URL models derived by the match model for that merchant web site. These field specifications locate and extract specific fields from the HTML document. The "name" specification is the name of the target field from which data is to be extracted by this field specification. The "content" specification is a regular expression applied to the actual-text vector field that suggests a text node may be the named field. The "spath" specification is a regular expression applied to the structured-path vector field that suggests a text node may be the named field. The "ipath" specification is a regular expression applied to the indexed-path vector field that suggests a text node may be the named field. The "apath" specification is a regular expression applied to the annotated-path vector field that suggests a text node may be the named field. The "extract" specification is a regular expression detailing what portion of a qualifying text node's actual-text constitutes the extracted field. The "extractfields" specification is a list of the "grouping expressions" in the extract regular expressions that are appended to form the extracted field. The "constraint" specification reflects integrity constraints on the fields composing the rule, such as distance between text nodes in the document's linear text node array.

A sample merchant model might appear as follows:

```
<Model site="walmart.com"
    <rule name="productDetail"
      version="1" priority="1"
      activate:url="product\.gsp" >
    <fspec name="title"
        apath="td.+class.{0,4}header0blue" extract="^(.+)$" />
    <fspec name="price"
        content="\$" apath="td.+class.{0,4}header0"
        extract="^.*?\$\s*(\d[\d\.,]*\d)\b" />
    <constraint fields="title,price" distance:max="25" />
  </rule>
</Model>
```

When the user lands on a merchant product detail page 124 the client application uses the merchant models to identify the page as a product detail page, and extract information such as: (1) the merchant name 174; (2) the URL for the page 176; (3) the title of the product 178; (3) the make and model of the product 180; (4) the SKU for the product 182; (5) the price of the product 184; (6) tax 186 and shipping charges 188; and (7) any promotions that apply to the product 190. The client application then sends the relevant data to the web-based application for comparison against the products in the database system 106.

Figure 6:
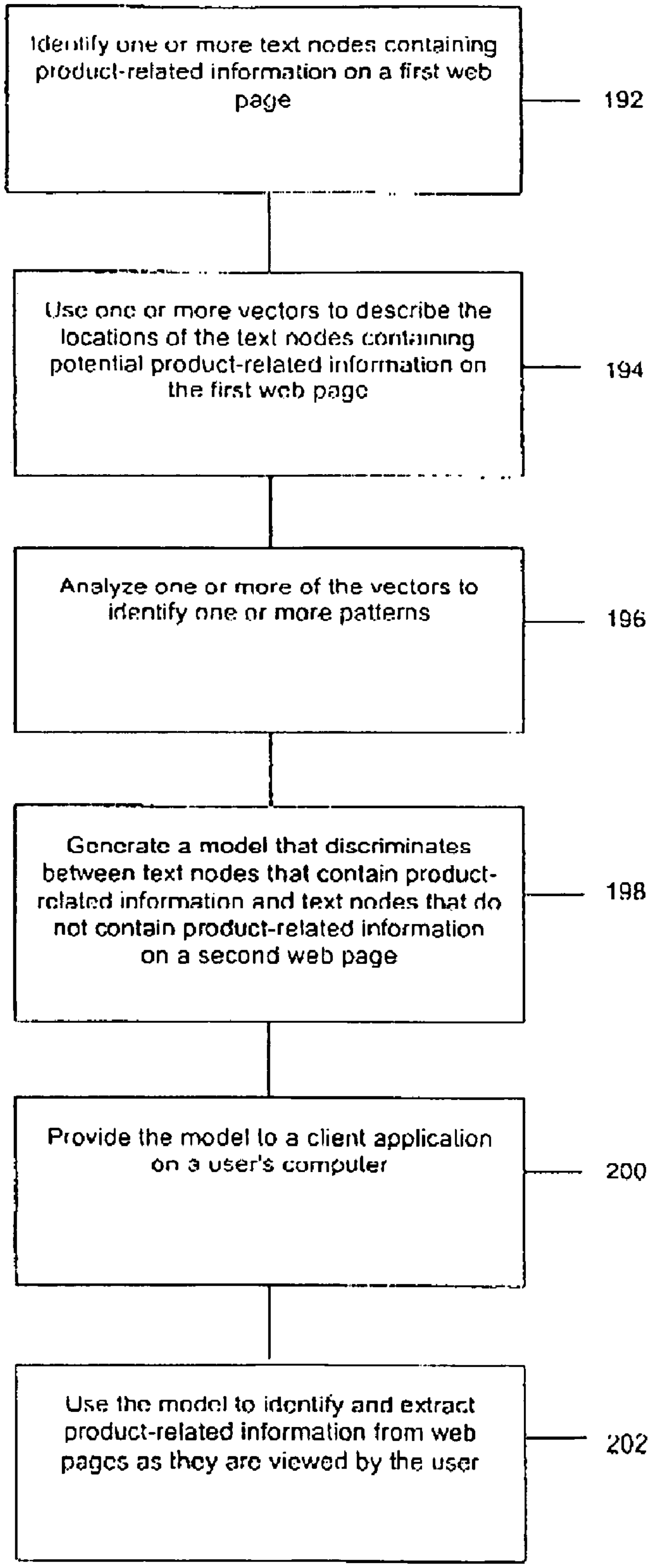
FIG. 6 is a flow chart indicating the steps of the process of updating a database of product-related information using information extracted by a user's computer according to one embodiment of the invention.

Referring to FIG. 6, in one embodiment the process for identifying and extracting product-related information on a web page when performed by the client model follows the same first four steps 192 through 198 as when the process is performed by the web crawler. The fifth step 200 is provides the model to the client application on a user's computer, and the sixth step 202 identifies and extracts product-related information from web pages as they are displayed to the user. In one embodiment, product-related data for a merchant web site is identified and extracted by wrapping a web page or from either a commercially available or privately arranged data feed rather than by crawling merchant web pages.

Normalization and Comparison of Data

A product detail page 124 being displayed to a user is referred to herein as the anchor page. Since merchants often describe the same product differently, the data from the anchor page must be processed so that it can be accurately compared against the available product information in the database system 106. The difficulty and complexity of this process varies by product type. For example, the comparison is relatively easy in the case of electronics, but may be very difficult in the case of apparel.

Using product titles as an example, product titles are stored in the database system 106 in a form that is referred to as a canonical title. The canonical titles in the database system represent the universe of products in the database system, and are created to reflect known products in the retail market. Canonical titles are created from known product titles by first normalizing common abbreviations into a standard form. For example, "w/," "with" and "w/" are mapped to "with." Synonymous words are next mapped to a standard form, using a set of topic-oriented thesauri such as an electronics thesaurus, a home/garden thesaurus, etc. Finally, features such as price, SKU, color, etc. in the title are identified and marked. An example of a canonical title "AUDIGY 2ZS PLATINUM SOUND BLASTER PCI SB0350" in its syntax and feature normalized form is:

```
_RCF_MP_VAL = a "manufacture/product name" in the title
_RCF_SKU_VAL = a "sku/model number" in the title
_RCF_CM_VAL = a "color/material" in the title
_RCF_MP_VAL_AUDIGY RCF_SKU_VAL_2_ZS
_RCF_CM_VAL_platinum
_RCF_MP_VAL_sound_blaster PCI__
_RCF_SKU_VAL_SB_0350
```

Incoming product titles, whether crawled from a merchant web site or returned by a client application, must be prepared such that they are in the same syntax and feature-normalized form as the canonical titles. The process starts with the exact same preparation that is performed on the canonical titles. The preparation of an incoming title "SOUND BLASTER PCI SB0350 (model#2ZS)" is shown in the following example:

```
__RCF__MP__VAL__sound__blaster PCI__
__RCF__SKU__VAL__SB__0350 RCF__SKU__VAL__2__ZS
```

Once the incoming product title is in the proper form, candidate matching products from the database system 106 are collected by identifying all canonical titles that have at least one feature in common with the incoming title. These are then ordered by the number of relevant features in common with the incoming title, and the top n candidates are selected. The selected canonical titles are then scored against the incoming title using feature importance tables (as discussed below).

The relative importance of different product features varies by product type. Products in the database system 106 are put into separate normalization categories. For each normalization category various features are assigned relative levels of importance. In one embodiment there are thirteen (13) normalization categories, as follows: apparel; arts structured (musical instruments, art supplies); arts unstructured (books, music, video, video games, artworks); baby; electronics; gifts (including flowers and specialty foods); hardware and tools; health and beauty; home and garden (including appliances); jewelry; office; pets; and sporting goods. The relative importance of different features is controlled by assigning different relative weights to the features in each normalization category.

In one embodiment, the set of features that are extracted for use in the normalization process includes: dimensions; ranges; quantities; size; SKU/ID; color/material; gender; manufacturer/product name; and head noun. The "dimensions" feature defines numeric quantities with units such as: "9 inch Ceramic Bowl" (feature: 9 inches); or 90 watt Light Bulb (feature: 90 watts). The "quantity" feature refers to unitless measurements of number of items, such as: AA Batteries (8 pack) (feature: 8 quantity); or Sterling Silver Forks—4 pcs. (feature: 4 quantity). The "size" feature refers to the size of the product, such as: Carbide Drill No. 42 (feature: 42 size); or Tie-Dyed Blue XL T-Shirt (feature: extra large size). The "ranges" feature refers to ranges of dimensions that may appear in a product title, such as: 0 to 25000 rpm Tool (feature: 0-25000 rpm); or Repair Manual, 1983-1989 (feature: 1983-1989 years). The "SKU/ID" feature refers to manufacturer identifiers, such as: Model #67GXZ789 Replacement Cartridge (feature 67GXZ789); or Computer PCG-Z100 (feature: PCG-Z100). The "gender" feature refers to the specific gender the product is meant for, such as: Mens Leather Strap Watch (feature: male gender); or Girls Running Shoe (feature: female gender). The "Color/Material" feature refers to the color or material used in the product, such as: Red Polka Dot Sun Dress (feature: red color/material); or 14K Gold Wedding Band (feature: gold color/material). The "Manufacturer/Product" feature refers to the name of a particular manufacturer or product name, such as: RYOBI BT3000 10" Table Saw (feature: RYOBI manufacturer/product name); or AIRJORDAN Basketball Sneakers (feature: AIRJORDAN manufacturer/product name). The "head noun" feature refers to the important noun of the title defining the class of product, such as: Evening Gown (feature: "gown" head noun); or QX67 Cordless Drill (feature: "drill" head noun). Examples of other categories of features that may be appropriate include style, shape, occasion, genre, breed/species, etc.

In one embodiment, each feature in each normalization category is assigned one of four different levels of importance. The four levels are: (1) required; (2) important; (3) marginal; and (4) not important. These four levels are then assigned numerical weights between 1 and 10, which can be adjusted as necessary to tune the normalization process based on experience in the different categories. A feature importance table can be constructed that reflects relative feature importance for each category. An example of such a feature importance table is shown below:

Feature Importance Table
Category: Electronics

| Feature | Exact | Substitution |
|---|---|---|
| Dimesion | Marginal | Important |
| Quantity | Marginal | Marginal |
| Size | Marginal | Marginal |
| Range | Marginal | Marginal |
| SKU/ID | Required | Not Important |
| Gender | Not Imporant | Not Important |
| Color/Material | Not Important | Marginal |
| Manufacturer/Product | Required | Not Important |
| Head Noun | Important | Required |

Thus, in electronics the feature importance table in this embodiment sets the Manufacturer/Product and SKU/Model features as "required," and the Color feature as "marginal."

In this embodiment, the four levels of importance are assigned the weights of 7, 5, 2 and 2 respectively. This would generate a feature importance score as follows:

$$\text{score} = \frac{(7*RFC) + (5*IFC) + (2*MFC) + (2*NFC)}{(7*RFS) + (5*IFS) + (2*MFS) + (2*NFS)}$$

$RFC$ = number of required feature types in common $IFC$ = number of important feature types in common $MFC$ = number of marginal feature types in common $NFC$ = number of non-feature words in common $RFS$ = number of required feature types in the crawl title $IFS$ = number of important feature types in the crawl title $MFS$ = number of marginal feature types in the crawl title $NFS$ = number of non-feature words in the crawl title Using the canonical and incoming titles described above, the resulting feature importance score would be:

$$\text{score} = \frac{(7*2) + (5*0) + (2*0) + (2*1)}{(7*2) + (5*0) + (2*1) + (2*1)} = 0.88$$

Within each category of products, a feature score threshold is established for determining whether the incoming product title will be considered either an exact match or a close substitution. The feature score thresholds may vary significantly depending on the category. For example, a score of 0.95 or better may be required for an exact match in electronics, while a score of 0.85 may be sufficient in apparel. Similar thresholds are uses to identify close substitute products.

In one embodiment, the system uses a feature-value taxonomy to improve the product comparison process by further resolving feature differences. For example, a feature value taxonomy that can assign very different values to distinct manufacturers such as "K-MART" and "CHRISTIAN DIOR" in the "manufacturer/product" feature for the clothing category will ensure that the system presents valid, meaningful potential substitute products.

In one embodiment, if the incoming product title from the anchor page is an exact match with a product in the database system 106, the database system compares the data from the anchor page with the information in the database system for that product from that merchant to determine whether the anchor page reflects updated information. If so, the database system is updated. Thus, the client application serves to supplement the web crawler system 104 by updating the database system as users view product detail pages 124 that have been previously crawled, constantly updating and improving data quality.

Figure 7:
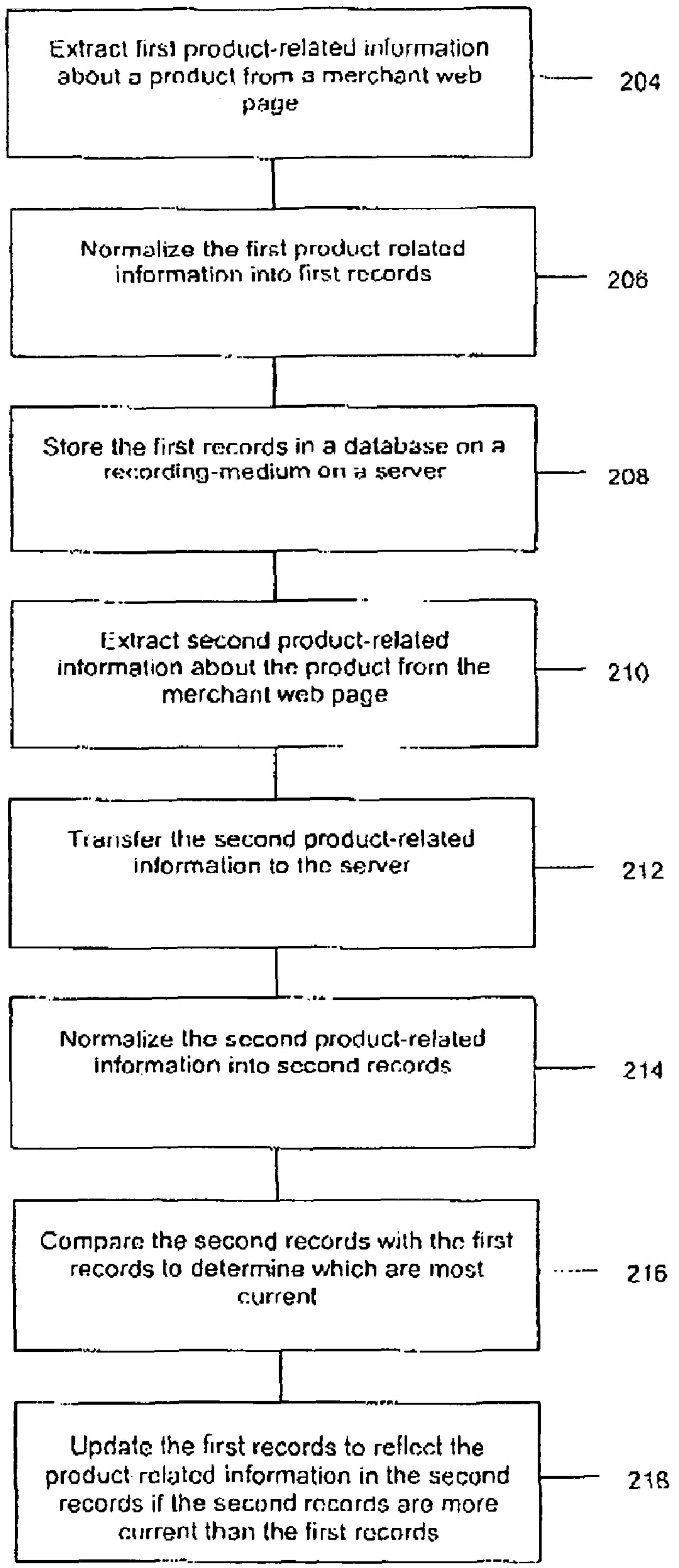
FIG. 7 is a flow chart indicating the steps of the process of updating a database according to one embodiment of the invention.

Referring to FIG. 7, in one embodiment the first two steps 204 and 206 in the process of updating product-related information in the database system 106 are to extract first product-related information about a product from a merchant web page and to normalize that information into first records. The third step 208 is to store those first records in a database system on a recording-medium in a server. The fourth step 210 is to extract second product-related information about the product from the merchant web page. The fifth step 212 is to transfer the second product-related information to the server. The sixth 214 and seventh 216 steps are to normalize the second product-related information into second records and to compare the second records with the first records to determine which are the most current. The eighth step 218 is to update the first records in the database system to reflect the product-related information in the second records if the second records are more current.

Figure 8:
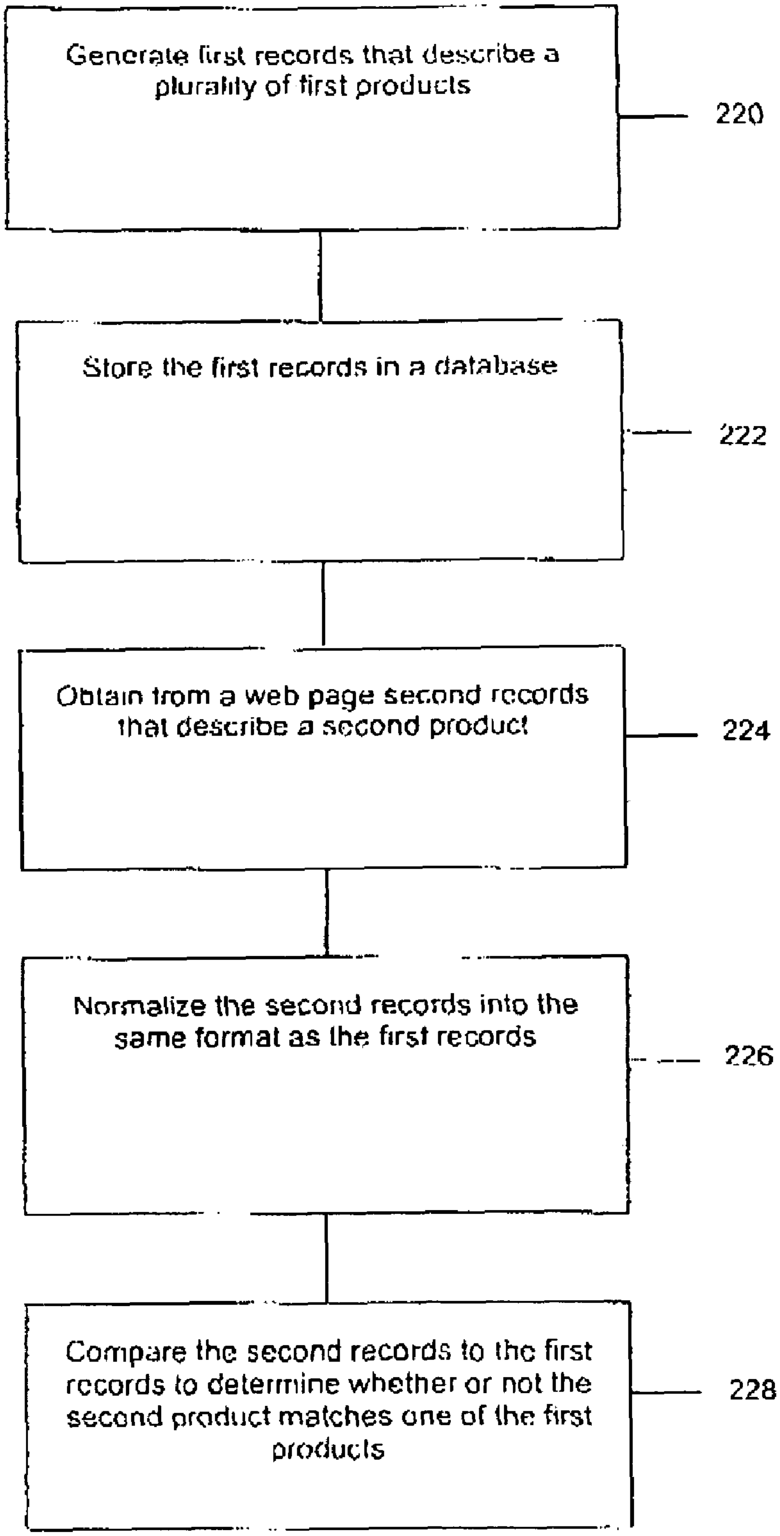
FIG. 8 is a flow chart indicating the steps of the process of product data comparison according to one embodiment of the invention.

Referring to FIG. 8, in one embodiment the first two steps 220 and 222 in the process of comparing and validating product-related information in the database system 106 are to generate first records that describe a plurality of products and store those first records in a database system. The third step 224 is to obtain from a merchant web page second records that describe a product. The fourth step 226 is to normalize the second records so that they are in the same format as the first records and can be compared to the first records. The fifth step 228 is to compare the first and second records to determine whether they contain information relating to the same product.

User Notifications

As a user browses the Web, the client application evaluates each web page and passes product titles to the back-end 148 for comparison against the canonical titles in the database system 106. If there is an exact product match, a close substitute product is available, or there is other information relevant to the anchor product, the client application provides a notification message to the user. It will be understood by those skilled in the art that any form of notification may be used to inform the user that additional relevant information is currently available, including without limitation an email notification, a permanent or transitory message window of any size, a new browser window, or even a sound or vibration such as a ring on a mobile phone or other digital device. Such notification may be provided by the client application, the web-based application, or any other source.

Figure 9:
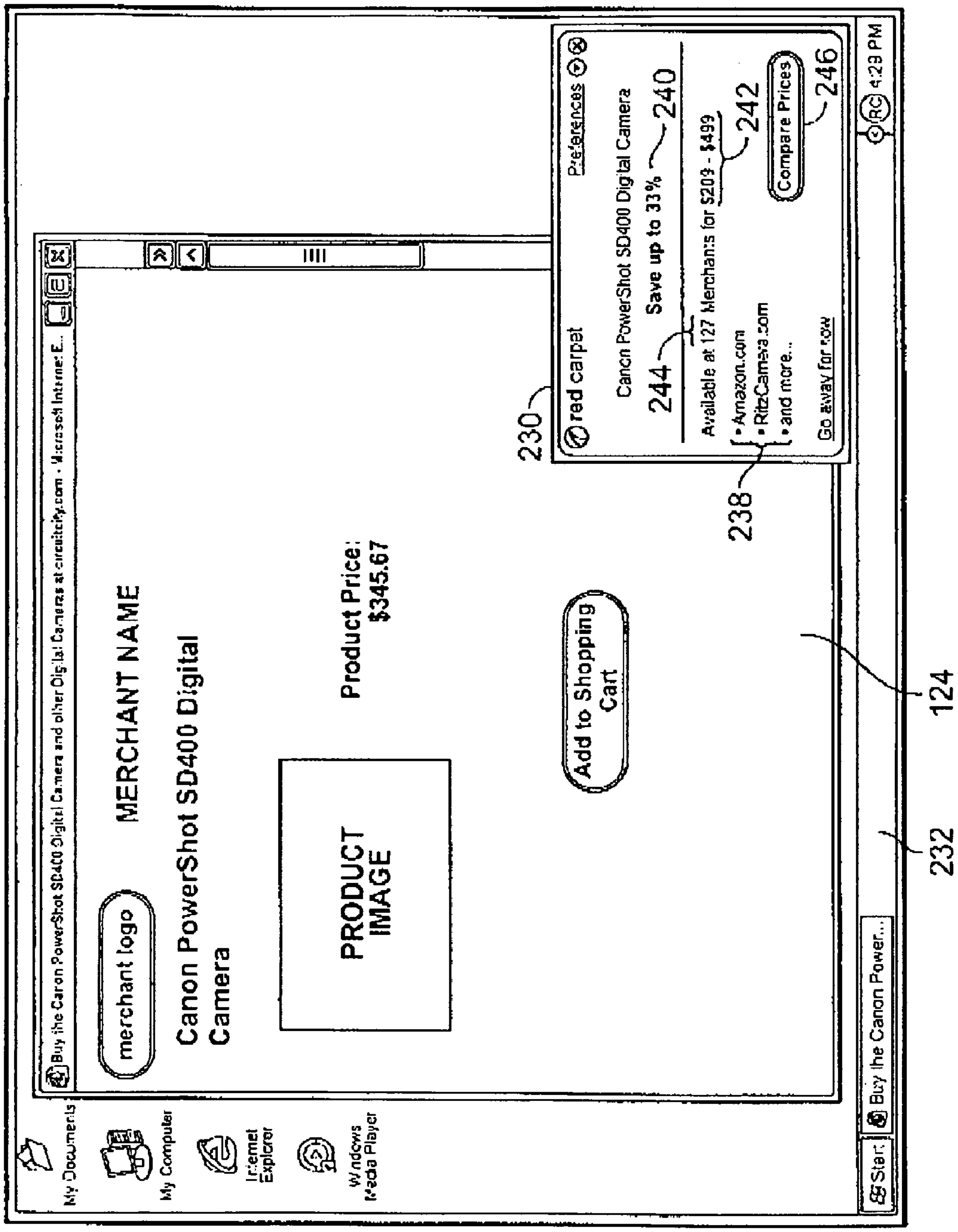
FIG. 9 is a diagram of an exemplary exact-match user notification toast according to one embodiment of the invention.

As illustrated in FIG. 9, in one embodiment the notification takes the form of a relatively small message window, commonly known to those skilled in the art as a toast 230, that slides up or fades onto the screen at the bottom area of the active window 232, then slides back down or fades out after a specified time period. This type of temporary message window will be referred to herein as a toast regardless of its specific form or location. Toasts can be set to appear on user's display for any period of time, or to stay indefinitely based on a given user action. For example, a toast may ordinarily fade out after a period of 5-6 seconds, but will stay on the screen as long as the user's pointer is positioned over some portion of the toast.

Figure 10:
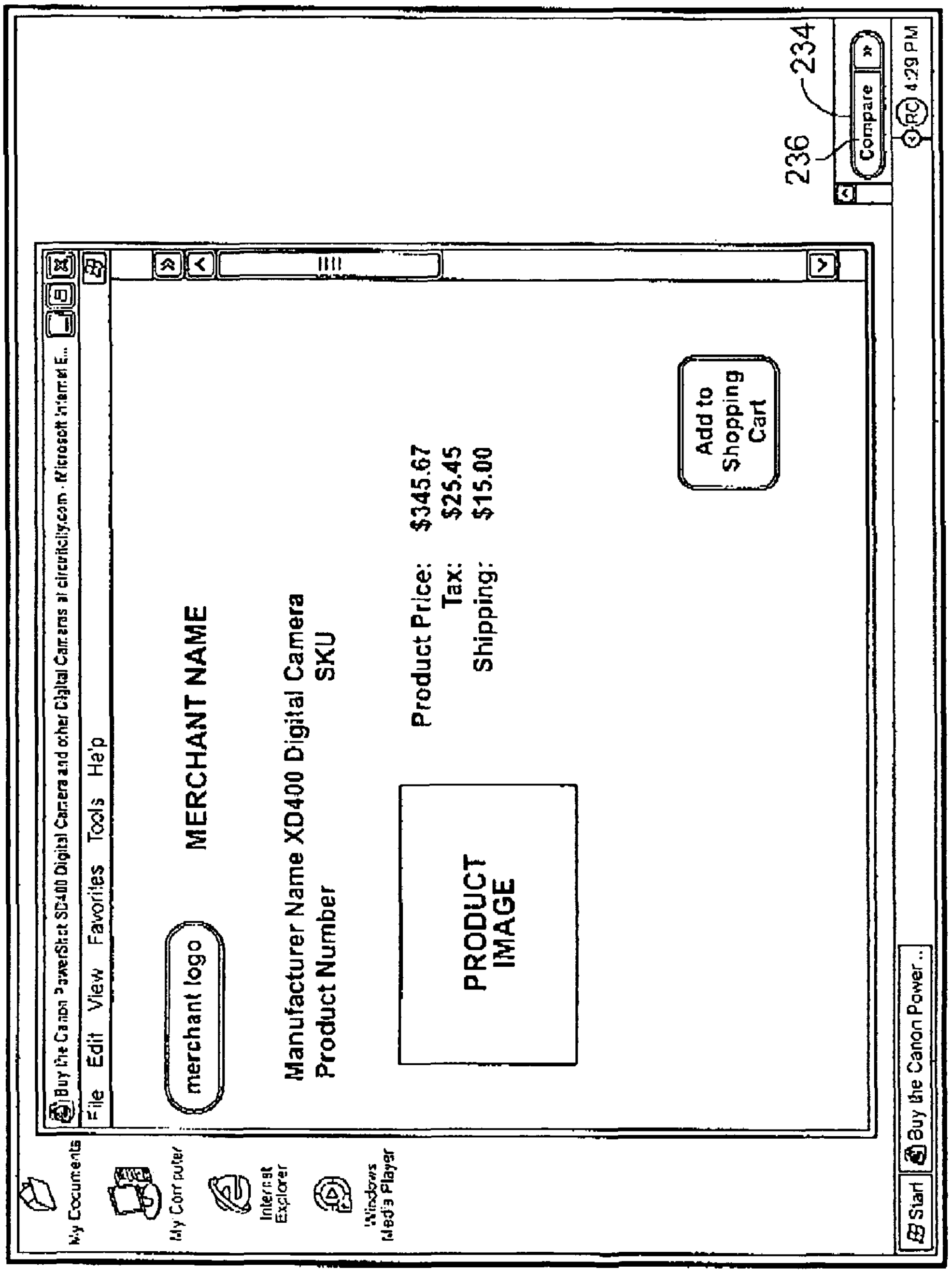
FIG. 10 is a diagram of an exemplary mini-toast user notification according to one embodiment of the invention.

Toasts can be set such that they can be minimized or otherwise re-sized or re-positioned on the display. As illustrated in FIG. 10, in one embodiment toasts are displayed as a mini-toast or tab that appears on the user's screen in a specific designated location. A mini-toast contains limited information, but can be expanded to a full toast by clicking on an expansion button 234, or the user can go directly to another page such as a price comparison grid 136 by clicking on the link 236. The particular information contained in the toast will vary, depending on the circumstances.

If a user's computer is displaying a product detail page 124 and the back-end 148 finds an exact match between the anchor product shown on that page and a golden product in the database system 106, the database system then checks the database to determine which other merchants sell the golden product. The back-end 148 then calculates the net effective price of the golden product for each merchant, the available range of prices, the number of alternate merchants, and the savings available from the alternate merchants as compared to the anchor page merchant.

The net effective price of a product is the calculated actual amount that would be paid by the consumer, after the application of any available promotions, coupons or discounts. As used herein, the terms promotion and coupon are used to refer broadly to any type of discount, special offer, sales incentive or other offer provided to a consumer to induce the sale of a product or products. In one embodiment the net effective price calculation will include any applicable taxes. The net effective price may also be calculated to include shipping charges, or it may only provide an indication when the merchant offers free shipping for that product. The price comparison grid 136 may also contain additional information regarding the listed merchants, such as popularity, security or other certifications or endorsements that may be of interest to users.

Information about other merchants offering the anchor product is provided to the web-based application for incorporation into an exact-match user notification. As illustrated in FIG. 9, an exact-match user notification may include a variety of relevant information, including the names of the other merchants 238 offering the same product. In one embodiment, the notification is in the form of an exact-match toast 230 that informs the user how much the user could save 240 on the matched product if purchased from a different merchant. The exact-match toast also indicates the available price range for the product 242, and the number of alternate merchants 244. In one embodiment, the list of alternate merchants is arranged such that the merchant with the lowest net effective price is first on the list, with the other merchants arranged in descending order based on net effective price. In other embodiments the list of alternate merchants displayed on the notification may be set based on a variety of factors such as merchant popularity, past user behavior, user preferences that can be set or modified by the user to screen merchants, or by different systems that allow merchants to pay a fee to improve or fix their position on this list. The toast may also include one or more links to additional information 246.

Price Comparison Grids

As illustrated in FIG. 3, in one embodiment the link to additional information 246, once selected, serves a display window showing a price comparison grid 136 that allows the user to easily compare the price offered by all known merchants offering the same product. The price comparison grid displays the title of the product 248 and model number 250 if appropriate, one or more images of the product 252, and a grid or table 254 showing the merchants that offer the product. For each merchant, the grid displays the list price 140 (which represents the lowest published product price on the merchant's publicly available web site), available promotions 142, tax and shipping information 256, and net effective price 258.

Figure 11:
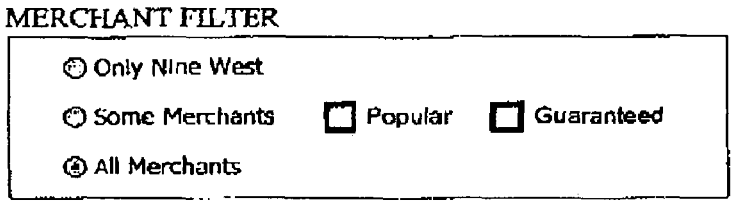
FIG. 11 is a diagram of an exemplary merchant filter according to one embodiment of the invention.

In one embodiment, users can filter the results shown on a price comparison grid to identify those merchants on the list that have certain characteristics. For example, as shown in FIG. 11, there may be a filter button that, once selected, filters the display to show only popular merchants 260, where popularity is measured based upon either third-party or system-based historical traffic and sales estimates. The grid could also be filtered to show only those merchants that provide free shipping 262. Other options would sort the results by a pre-compiled user-specific list of favorite merchants, or filter out merchants based on a similar list of merchants the user does not wish to see (e.g., a user-defined "black list").

In another embodiment, users can set a threshold level of popularity for the merchants that are displayed on the price comparison grid 136, where popularity is measured based upon either third-party or system-based historical traffic (browsing behavior) and sales estimates captured as users browse or buy products on the network. Popularity can be captured and calculated on a merchant or product basis, and can be formulated using a variety of different traffic and sales metrics. In another embodiment, merchants can be filtered based on participation in certain consumer protection programs. Other filters may be set for virtually any merchant characteristic or offer.

As illustrated in FIG. 3, in one embodiment, the price comparison grid 136 also includes an alert feature 264 that allows the user to set an alert to notify the user when the price of the displayed product reaches or drops below a specific value. Such an alert that is set by the user will be referred to as an active alert. The active alert feature can be displayed as a sliding tab 266 that can be moved along a price continuum 268 such that the user can easily set the active alert directly on the open display window. In another embodiment, the active alert feature also includes a drop-down menu that allows the user to select specific conditions or limitations on the alert, such as limiting the alert to particular merchants.

Figure 12:
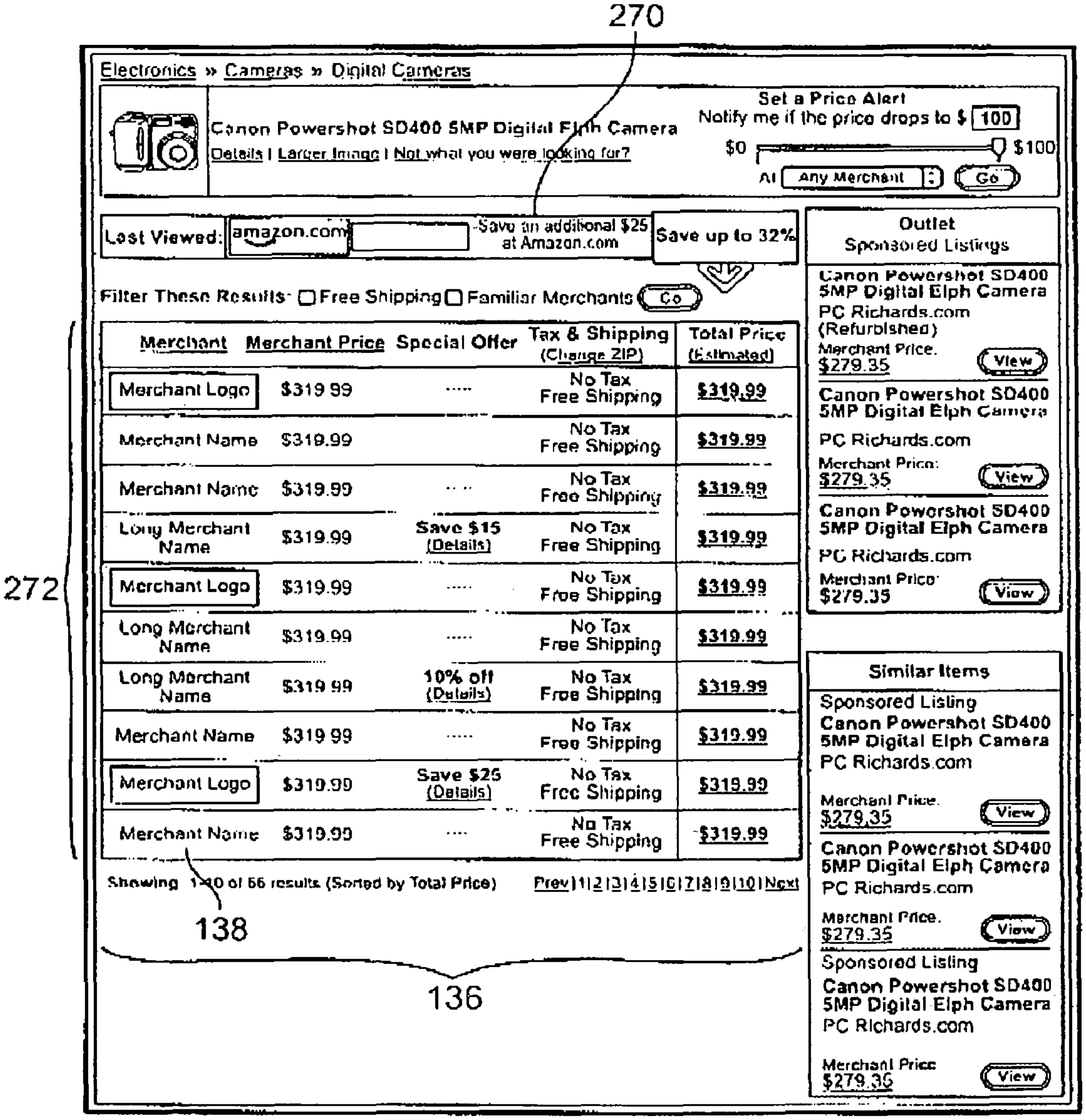
FIG. 12 is a diagram of an exemplary price comparison grid according to one embodiment of the invention.

In another embodiment, the price comparison grid includes a special promotional offer or other incentive module available only to the anchor merchant for the purpose of enticing the user to return and purchase the product from the anchor page merchant for a price that is different than what is currently being offered to the public. As illustrated in FIG. 12, this anchor merchant incentive listing 270 may be displayed above the list of other merchants 272, or otherwise positioned prominently on a price comparison grid 136 to enhance the likelihood that the user will return to the anchor merchant. Merchant incentives may be based on a variety of pre-defined, automated business logic rules. For example, a merchant could set rules to serve a 20% discount offer whenever it is the anchor merchant and would otherwise appear below a certain point on the price comparison grid for a particular product. This tool gives a merchant the ability to offer the incentive only in specific situations, or to set the incentive to dynamically adjust to different levels for variable units of time in response to the specific situation.

The level of control and automation available to the anchor merchant is even greater when the anchor merchant provides access to certain information, such as product inventory levels and cost basis. For example, assume the anchor merchant has 20 widgets that it purchased at a cost of $50.00 each, the price for a widget on its web site is $100.00, and the best competing price offered by another merchant is $90.00. The anchor merchant could set a rule to offer a coupon reducing its net effective price for the widget to the highest price that will ensure the top position on the price comparison grid 136, with a floor of the cost plus 25%. These automated logic rules can be adjusted so that they operate differently as circumstances change. For example, when the anchor merchant's inventory reaches a certain threshold, the floor might drop to the cost plus 10% in order to drive additional sales and bring inventory back within a target range. Such rules can be set for a specific product or group of products.

Figure 13:
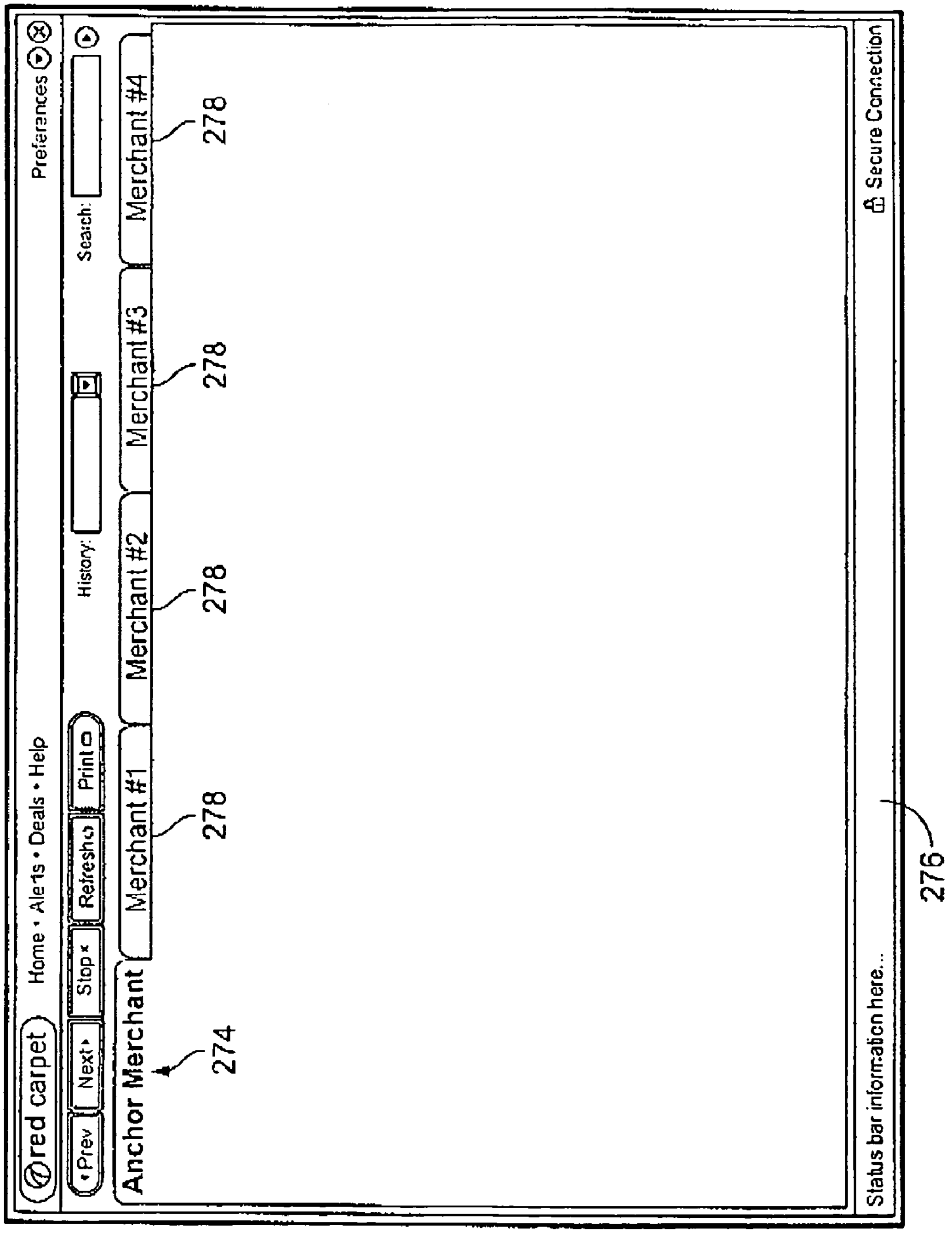
FIG. 13 is a diagram of an exemplary client container with tabbed display windows according to one embodiment of the invention.

In one embodiment, the price comparison grid provides for the user to obtain additional information from the listed merchants or to directly visit that merchant's product detail page. The name of each listed merchant 138 on the grid is a link that can be clicked by the user. As illustrated in FIG. 13, this link opens the merchant's product detail page in a new, tabbed window 274 within the client container 276 already open on the user's computer, while maintaining other tabs 278 that, when selected, allow the user to easily display the tabbed web page. A new tab 278 is created for each merchant page that is opened. This feature allows the user to easily move back and forth between the merchant product detail page and the price comparison grid, or to move back and forth among various merchant product detail pages by using the tabs.

Each merchant product detail page 124 displayed through the client application is fully functional. From the tabbed page in the client container the user can access all of the merchant's features and products, and can place an order 276 for either the product displayed on the anchor page or for any other product offered by that merchant.

As illustrated in FIG. 14, the back-end 148 can also maintain a history of price comparison grids 280 that can be accessed by the user. In one embodiment, the system maintains a complete history of all price comparison grids 136. The user can access this history easily to view prior price comparison grids that have been displayed to that user. In another embodiment, the system maintains a complete history of all price comparison grids that were made available to the user, whether the user chose to view them at the time or not.

Figure 15:
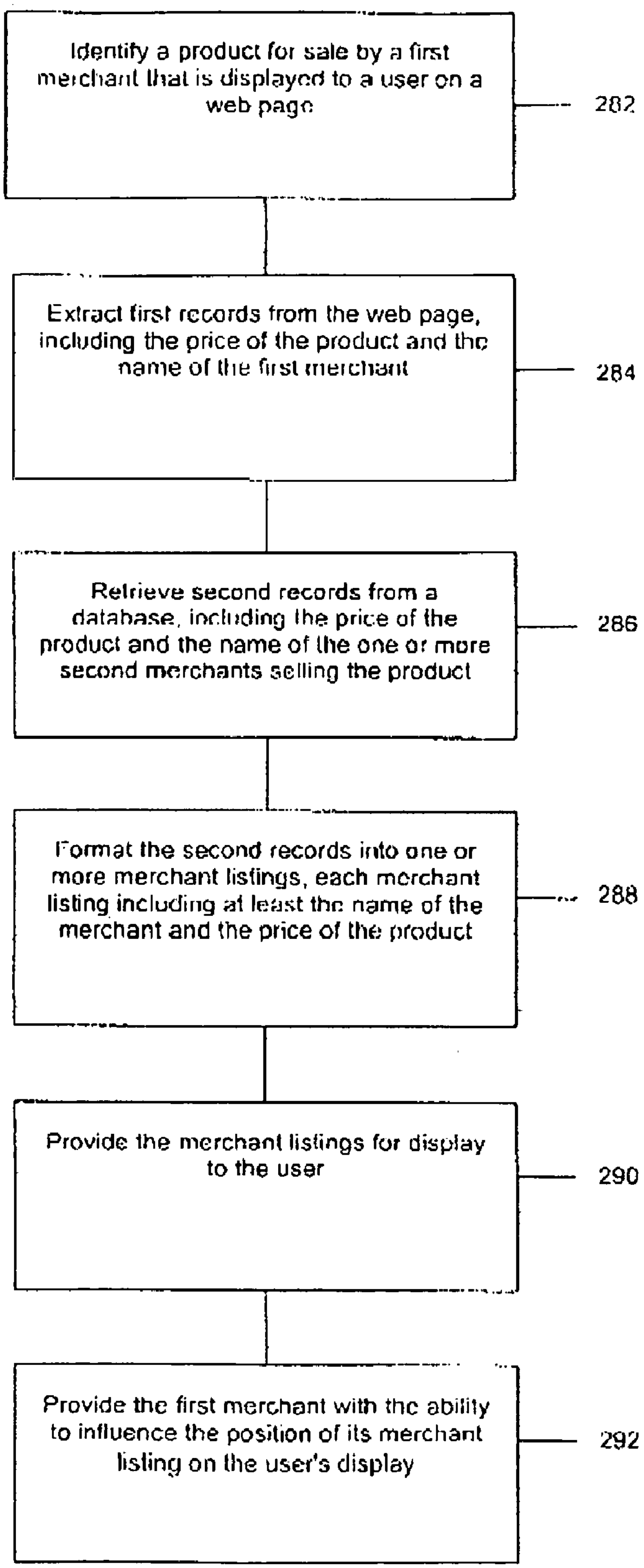
FIG. 15 is a flow chart indicating the steps of the process of generating a price comparison grid according to one embodiment of the invention.

Referring to FIG. 15, in one embodiment the first step 282 in the process of comparative shopping is to identify a product offered for sale by a first merchant that is displayed to a user on a merchant web page. The second step 284 is to extract first records from the merchant web page such as the price of the product and the name of the merchant. The third step 286 is to retrieve second records from a database system including the prices and the names of any merchants selling the product. The fourth step 288 is to format these second records into merchant listing that can be displayed to a user, each merchant listing containing at least the name of the merchant and the price of the product. The fifth step 290 is to display the merchant listings to the user so that the user can see which merchants offer the product being displayed and compare their prices for the product. In one embodiment, the sixth step 292 in the process is to provide the first merchant with the ability to influence the position of its merchant listing on the user's display by offering a discount that reduces its net effective price for the product.

Substitution Product Grids

If there is no exact match in the database system 106 for the anchor product, but a close substitute product is identified, the back-end 148 similarly checks the database system to determine which other merchants sell appropriate substitute products. As described above, a substitute product is one that falls within a particular range in its normalized feature comparison score. The database system calculates the net effective price of the substitute product for each merchant. The database system then evaluates several factors, including price ranges, brand, etc., to determine which merchant listings should be shown to the user. It then calculates the available range of prices, the number of alternate merchants, and the savings available from the alternate merchants as compared to the anchor page merchant. The back-end then checks to determine whether or not there is an applicable promotion or other offer associated with any of the selected merchant listings.

If there is no applicable promotion or other offer, but a potential substitute product has been identified, the user may be notified by the client application that there are merchants offering a product that is similar to the anchor product. Such substitution product notifications are referred to as no exact-match/no-offer notifications. These may take the same forms as discussed above with regard to exact-match notifications, and may similarly include a link or other mechanism for displaying a comparison grid for the substitute products.

Figure 16:
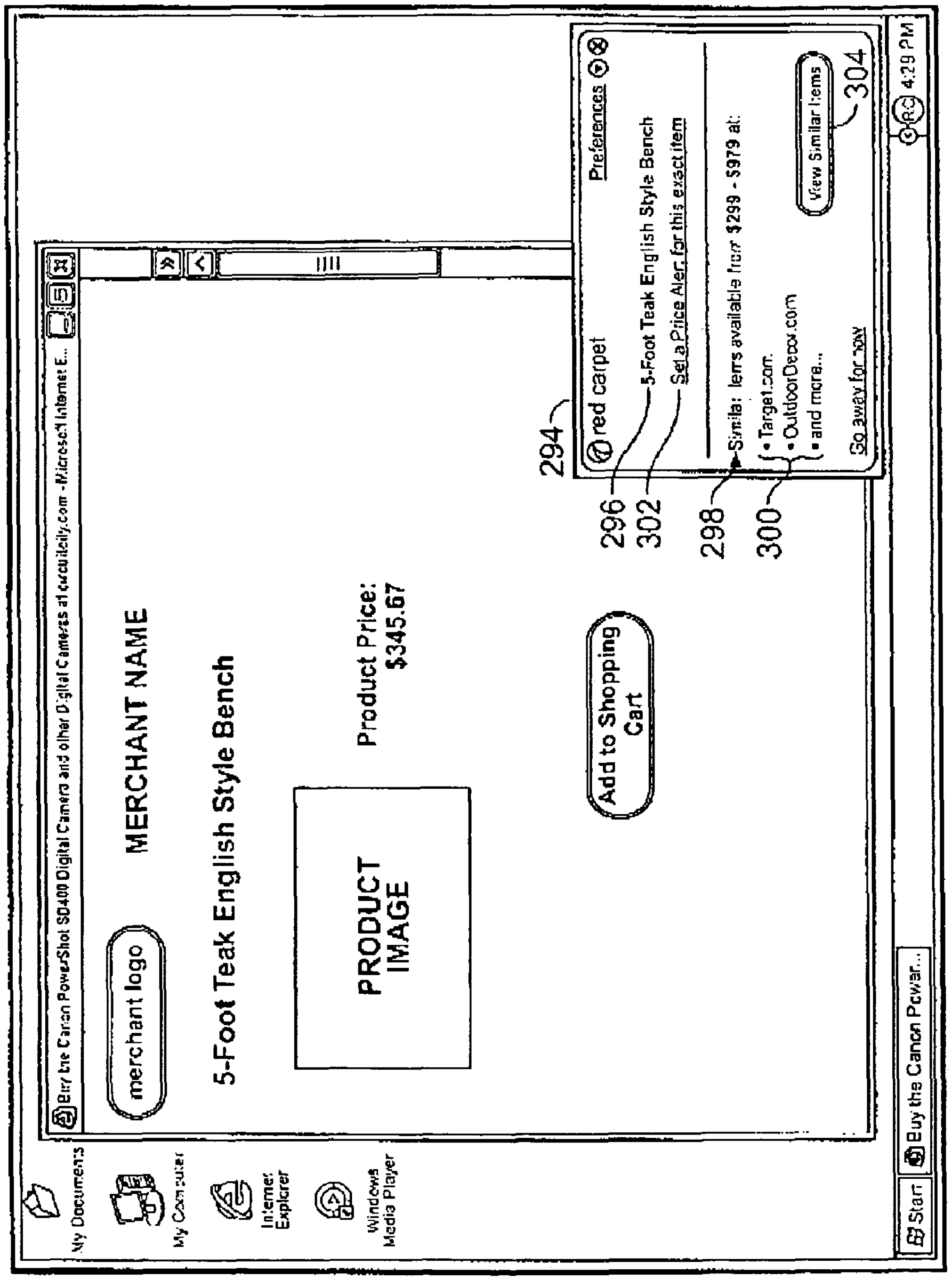
FIG. 16 is a diagram of an exemplary no exact-match substitution toast notification according to one embodiment of the invention.

As shown in FIG. 16, in one embodiment a no exact-match/no-offer toast 294 identifies the anchor product 296, and indicates that similar products are available in a specific price range 298 from several other merchants 300. This toast may also indicate that the user can set a price alert 302 for the anchor product with a link to that option. There is also a link to view the substitute products 304.

If the system finds a promotion relevant to the anchor product, it may serve an alternative no exact-match/offer notification. Such a notification can take the form of a toast that indicates the terms of the available offer for the anchor product. The toast may also indicate that similar products are available within a particular price range, and include a link to view the available substitute products.

Figure 17:
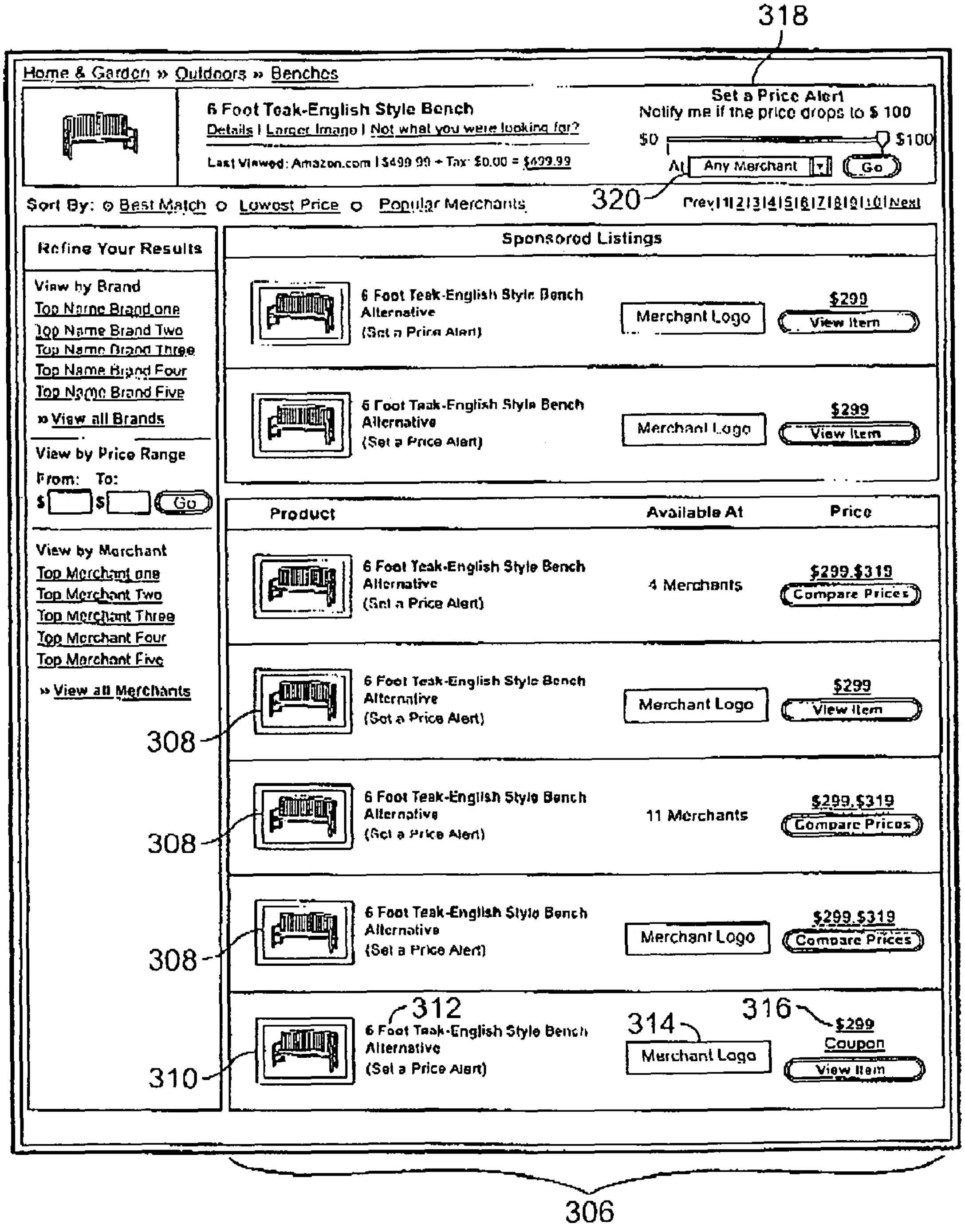
FIG. 17 is a diagram of an exemplary substitute product grid according to one embodiment of the invention.

As illustrated in FIG. 17, in one embodiment the available substitute products are displayed in a substitute product comparison grid 306 similar to a price comparison grid 136. The substitute product comparison grid contains listings for one or more substitute products 308 available from other merchants. The grid may include both organic result listings sorted by a particular parameter such as relevance, brand, product popularity or price, and sponsored or paid listings that feature particular merchants or relevant products. The various listings may include a photo of the substitute product 310, a product title 312, merchant name 314, price or price range 316, and any other relevant information. The substitution product grid may also include an alert slider 318 that allows the user to set an active alert for the price of the anchor product. Other options may include filters 320 and sorting logic that allows the user to sort the displayed merchant listings by various criteria, such as merchant, price, product popularity, category, etc.

As illustrated in FIG. 3, substitute products may also be displayed in a substitution module 322 that appears within the display window along with a price comparison grid 136. In one embodiment, the substitute products appear under a separate heading on the right side of the window displaying the price comparison grid. These substitute product listings offer an alternative to the anchor product, even though the anchor product is an exact match with a golden product and is offered by other merchants. Other sponsored listings 324 may also be displayed within separate sections inside the same display window, such as prior year models of the anchor product, related models with slightly different specifications, refurbished products, etc.

In some cases, the product displayed on the anchor page may be unique to the anchor merchant and there may be no appropriate substitute products. In such cases, once the back-end 148 has matched the anchor product to available product information in the database system 106, it will check for any promotions or other relevant information. If available, such information is provided to the web-based application for incorporation into an appropriate user notification. For example, the client application may notify the user that there is a coupon or promotional offer available for the anchor merchant or the product displayed on the anchor page. The client application may also notify the user that an active alert can be set for that product to notify the user of a particular event such as when the price is reduced to or below a specific value. In addition, the notification may provide information about the availability of similar items at other merchants, even though those items are not direct substitutes for the product displayed on the anchor page.

While these steps of evaluating the anchor product against entries in the product and merchant database system 106, and calculating and comparing price and other data have been described as being performed by the database system or the back-end 148, it will be understood by those skilled in the art that this process can be undertaken by various component and/or applications depending on the specific structure and programming of the system.

Promotions and Coupons

In one embodiment, the system has the ability to find, validate, store, match and present coupons to the user in a fully integrated fashion. As illustrated in FIG. 18, available coupons can be displayed on a dedicated coupon web page 326. Each coupon listing 328 may include the name of the merchant 330, the terms of the offer 332, the expiration date 334 and any other information or restrictions. The coupons may be sorted in any order, such as from most recently issued to oldest, by expiration date, etc. In one embodiment, the coupon page includes a separate listing of the most popular coupons 336. In another embodiment, merchants can pay to have their coupons featured on this page. In one embodiment, the coupon page includes buttons or icons for filtering the list of coupons by product category 338 and merchant 340.

The coupon web page 326 may be accessed from a variety of points, including the home page for the web-based application, from a link in the navigation bar presented to the user, from various alert notifications and search results pages, or from a user-specific notification such as a toast. If the user has come to the coupon page from a notification regarding a specific coupon, that coupon may be displayed at the top of the list or otherwise prominently on the page. Links 342 from the coupon web page take the user directly to a pre-defined coupon landing page selected by either the system or the merchant.

Coupons or other offers displayed by the client application to the user may be generally available promotions that have been identified by the crawler, or they may be exclusive promotions available only to users of the system that have been separately arranged with the merchant. In one embodiment, merchants can arrange for exclusive promotions on either a site wide basis or for a single or limited set of products. A site-wide offer applies to all products on that merchant's web site. Limited offers, also referred to as basket offers, may be structured to apply to any definable set of products, including particular product categories, sale items, etc., or may require satisfaction of other conditions such as a specific minimum purchase amount. Merchants can create automated logic rules that will be applied to dynamically generate exclusive promotions based on a wide variety of conditions, including competitive environment, merchant inventory levels, price sensitivity, projected latent demand, etc. Coupons can also be limited by time or any other measurable criteria, such as the first n orders, etc.

In one embodiment, the client application will notify the back-end 148 whenever a user lands on a merchant web page, regardless of whether or not it is a product detail or index page 124. The system will then check the database system 106 for coupons relating to that merchant. If one or more coupons are available, the client application will serve a merchant deal notification. This notification can take the form of a toast that identifies the merchant and describes the offer, and can include a link to the coupon web page 326 where the specified merchant's coupons will be featured.

In one embodiment, coupon information such as a redemption code may be displayed in a coupon bar that is part of the client container 276 that defines the display window for the client application. For example, if a user clicks the link for a merchant coupon 344 from the coupon page of the system, they will land on the merchant's coupon landing page in a new, tabbed window within the client container. If the user then continues on the merchant site to a product or checkout page, the applicable coupon information will continue to be displayed on the client container so it is easily accessible during the checkout process. In another embodiment, relevant coupon information will also be automatically filled in on the appropriate merchant page to redeem the coupon. Coupon-related information can also be encrypted to prevent public dissemination of coupon details.

Once a coupon or promotion has been applied, the coupon information on the client container 276 may notify the user that the coupon has been applied. If the coupon cannot be automatically applied, the coupon information on the client container can indicate the necessary information to apply the coupon or promotion manually.

Figure 19:
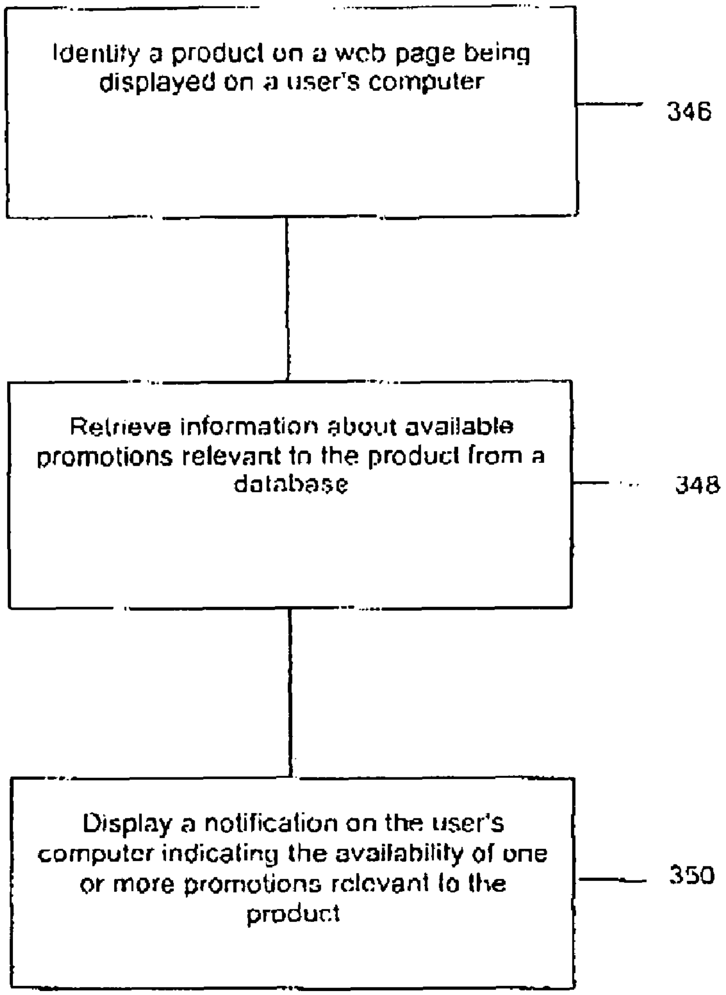
FIG. 19 is a flow chart indicating the steps of the process of identifying and notifying a user of relevant promotions according to one embodiment of the invention.

Referring to FIG. 19, in one embodiment the first step 346 in the process of delivering online sales promotions to users is to identify a product on a web page being displayed on a user's computer. The second step 348 is to retrieve information about available promotions relevant to the product from a database system. The third step 350 is to display a notification on the user's computer indicating the availability of one or more promotions relevant to the product.

Web-Based Application Program

The web-based application is a network-based program physically located on one or more web application servers 118. The web-based application can be accessed by users either through the client application or through a dedicated web site. In one embodiment, users who wish to access the web-based application must register and establish an account. Registered users access their account and the web-based application by entering certain identifying security information, such as a username and password.

In one embodiment, the web-based application is the primary access point for the comparative shopping system 100. It will be understood by those of ordinary skill in the art that the web-based application can perform many, if not all, of the functions of the client application and the distribution of different tasks between these programs can shift without impacting the scope or nature of the present invention. Registered users and others who have previously visited the web site may be identified when they visit the web site based on the presence of a cookie stored in the user's system. Such users who can be identified are considered known-users and will first land on a known-users home page. When a known-user leaves the homepage, that user will be served a client login screen that will provide access to the web-based application. Registered users may also set their preferences so that their identifying information is accessed by the web-based application and they are automatically logged onto the system when they access the known-users home page.

It will be understood by those skilled in the art, that many of the activities described in relation to the client application can be performed by the web-based application program. In one embodiment, the web-application performs all of the functions otherwise performed by the client application including tracking user behavior and identifying and extracting product-detail information from web sites that are being displayed to a user.

Active and Passive Alerts

As described above, users can set active alerts so that they will be notified when the price of a particular product reaches a specified level selected by the user. In one embodiment, the active alert can apply to any merchant selling that product, or it may be limited to particular merchants selected by the user.

Users can set active alerts from a variety of locations, such as a price comparison grid 136 page, search results page, alert notification, or a dedicated alerts page. Active alerts can be set to notify the user by any available means, including without limitation by a price alert toast, by a price alert email, or by a price alert notification window. Users can review and revise their active alerts through an active alerts page or through a general alerts page that includes both active and passive alerts.

Figure 20:
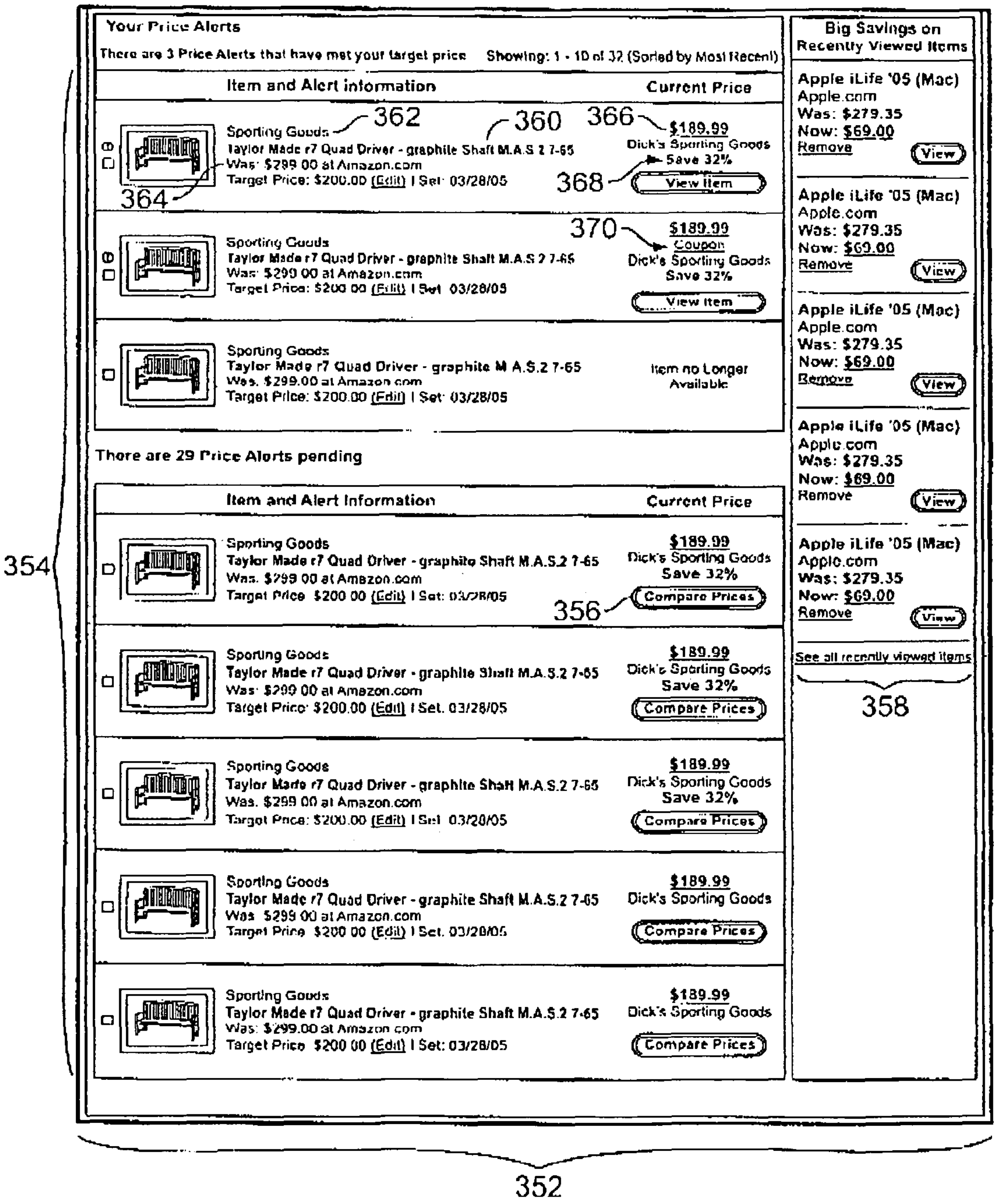
FIG. 20 is a diagram of an exemplary general alerts web page according to one embodiment of the invention.

As illustrated in FIG. 20, in one embodiment a general alerts page 352 is displayed through the web-based application. In one embodiment, the alerts page includes an active alerts grid 354 of information relating to the user's active alerts. The specific alert entries in this alert grid contain links 356 to price alert comparison grid pages that provide a current price comparison grid 136 for the target product. Similar links can take the user directly to a specific merchant that has satisfied the alert criteria. The alerts page may also include passive alerts 358 that relate to other products of potential interest.

In one embodiment, the active alerts grid 354 displays a variety of information to the user about the active alerts that have been set. Each alert is identified by the target product 360, and the listing displays the product category 362, the price 364 on the anchor page that the alert is set against, the lowest current price 366 available from any merchant that satisfies the users pre-defined criteria (which can include all merchants in the system), the percentage savings 368 this represents from the price when the alert was set, and any available merchant coupons 370.

Figure 21:
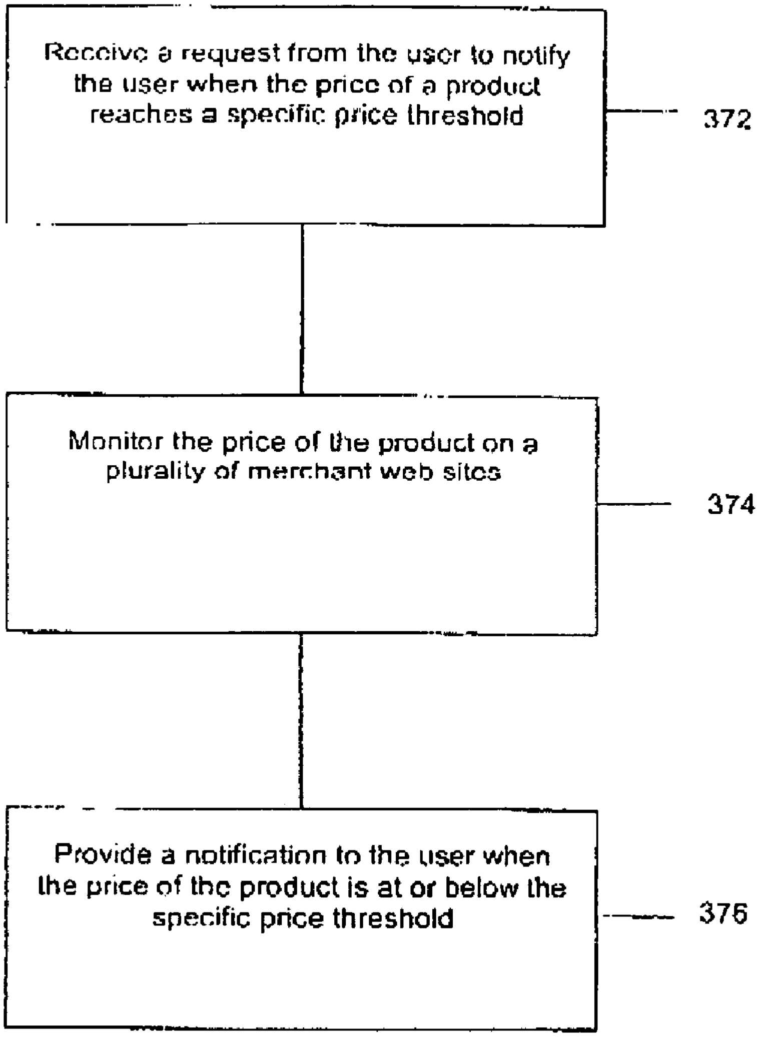
FIG. 21 is a flow chart indicating the steps of the process of setting and notifying a user of an active alert according to one embodiment of the invention.

Referring to FIG. 21, in one embodiment the first step 372 in providing an active price alert is to receive a request from a user to notify the user when the price of a specific product reaches a specified price threshold. The second step 374 is to monitor the price of the product on a plurality of web pages. The third step 376 is to provide a notification to the user when the price of the product is at or below the specified price threshold.

In one embodiment, the system also sets alerts automatically based on information collected from the user's web browsing behavior. These will be referred to as passive alerts. Passive alerts may be set based on a variety of criteria. In one embodiment, passive alerts for each user are set based on the specific product detail pages 124 or price comparison grids 136 that have been viewed by that user. The passive alert price that triggers an alert to the user is set based on a specific change in price as compared to the alert anchor price, such as a specific percentage reduction in net effective price. As with active alerts, this reduction in net effective price may reflect an actual list price reduction that a merchant has published to its publicly available web site, the availability of a coupon or free shipping, or a special offer from the merchant.

For example, if a user views a product detail page 124 for Camera at Merchant A, but does not view a price comparison grid 136 for Camera and there is no record of that user previously viewing a product detail page for Camera, a starting reference point called the anchor information point is set based on the product detail page from Merchant A. The alert anchor price will be set at the list price viewed by the user the first time the Camera was viewed. This may be either the list price shown on a product detail page, or the lowest net effective price on a viewed price comparison grid.

If there is an exact match for Camera in the database system 106, either with a golden product or unique product entry, a passive alert will be set for a specific price reduction from the alert anchor price. In one embodiment, the passive alert price threshold for a product that has been viewed is set based on the type of product. All known products are grouped into various categories using a defined taxonomy. Examples of top level categories in this taxonomy include electronics, jewelry, tools, etc. Each category and subcategory within the taxonomy is assigned a specific passive alert price threshold. The passive alert threshold may be set as a percentage reduction from the alert anchor price, or as a fixed amount below the alert anchor price. If the lowest net effective price for product drops below the passive alert price that reflects this threshold, a passive alert is triggered.

In one embodiment, passive alerts are also set indirectly based on user browsing behavior. Appropriate products for passive alerts are identified based on an analysis of web sites and product detail pages viewed by the user. For example, frequent visits to merchant web sites that specialize in home improvement products and product detail pages for power tools are behavioral indicators that the user may be interested in purchasing such products. The back-end 148 would then identify relevant product offerings and set passive alerts for special promotions on power tools of various types, even though the user did not view a product detail page 124 or price comparison grid 136 for those specific products.

Passive alerts may be displayed to the user in a variety of contexts. In one embodiment, passive alerts are displayed to known users on their logged-in home page and are displayed to all users on price comparison grid 136 pages. Passive alerts displayed on a price comparison grid page may appear as listings identifying the product and relevant price reduction.

Passive alerts may also be displayed on the known-user homepage, search results page, or any other appropriate page where the user is known.

Figure 22:
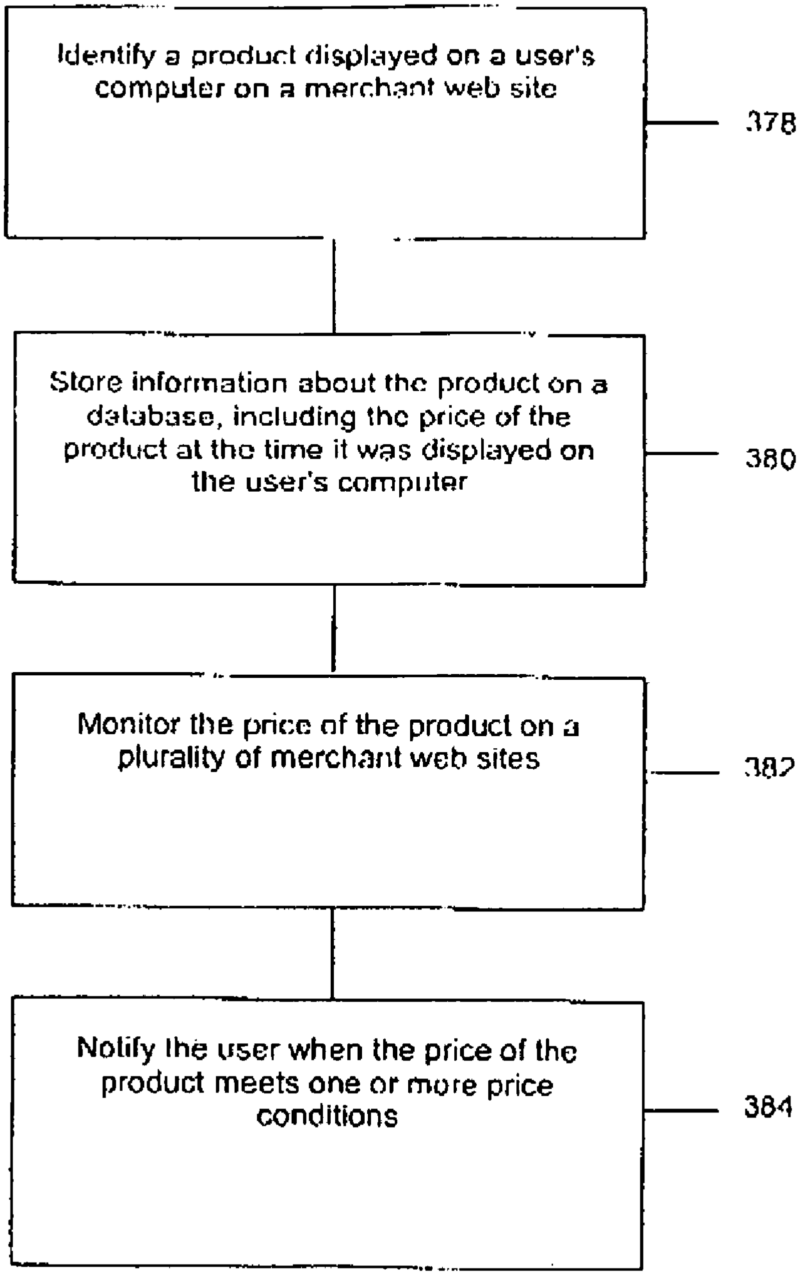
FIG. 22 is a flow chart indicating the steps of the process of setting and notifying a user of a passive alert according to one embodiment of the invention.
Figure 23:
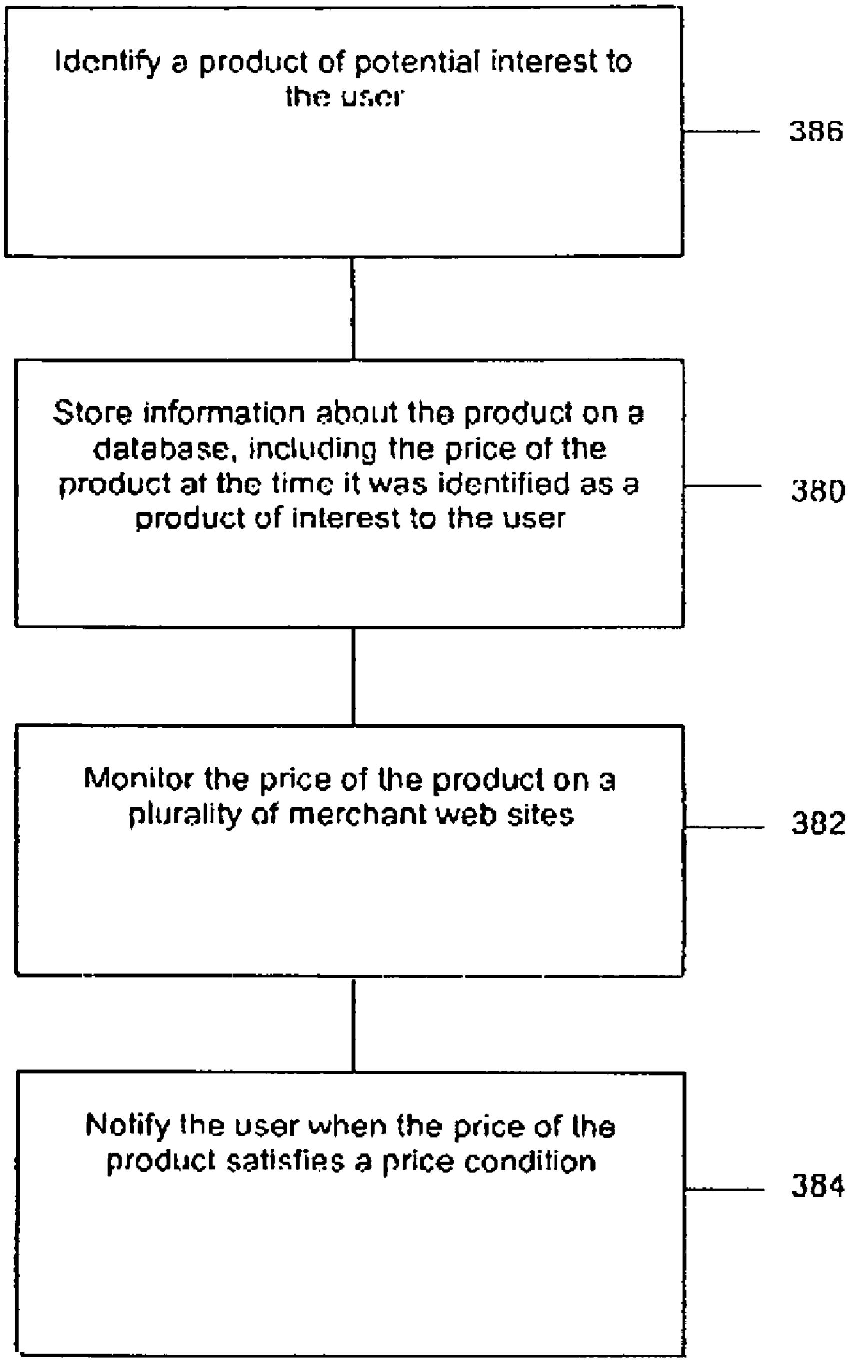
FIG. 23 is a flow chart indicating the steps of the process of setting and notifying a user of a passive alert according to one embodiment of the invention.

Referring to FIG. 22, in one embodiment the first step 378 in providing a passive price alert is to identify a product displayed on a user's computer on a merchant web site. The second step 380 is to store information regarding the product on a database system, including the price of the product at the time it was displayed on the user's computer. The third step 382 is to monitor the price of the product on a plurality of web pages. The fourth step 384 is to provide a notification to the user when the price of the product one or more price conditions. Referring to FIG. 23, in another embodiment the first step 386 in this process of providing a passive price alert is to identify a product of potential interest to the user, and the remaining steps are the same as described above.

Any reduction in the relevant price of a product can trigger an alert for a that product. For example, where the alert is set at a specific net effective price, the reduction in net effective price that triggers the alert may reflect an actual reduction in the publicly available list price for a merchant, or the availability of free shipping, a coupon or another promotional offer from the merchant.

Figure 24:
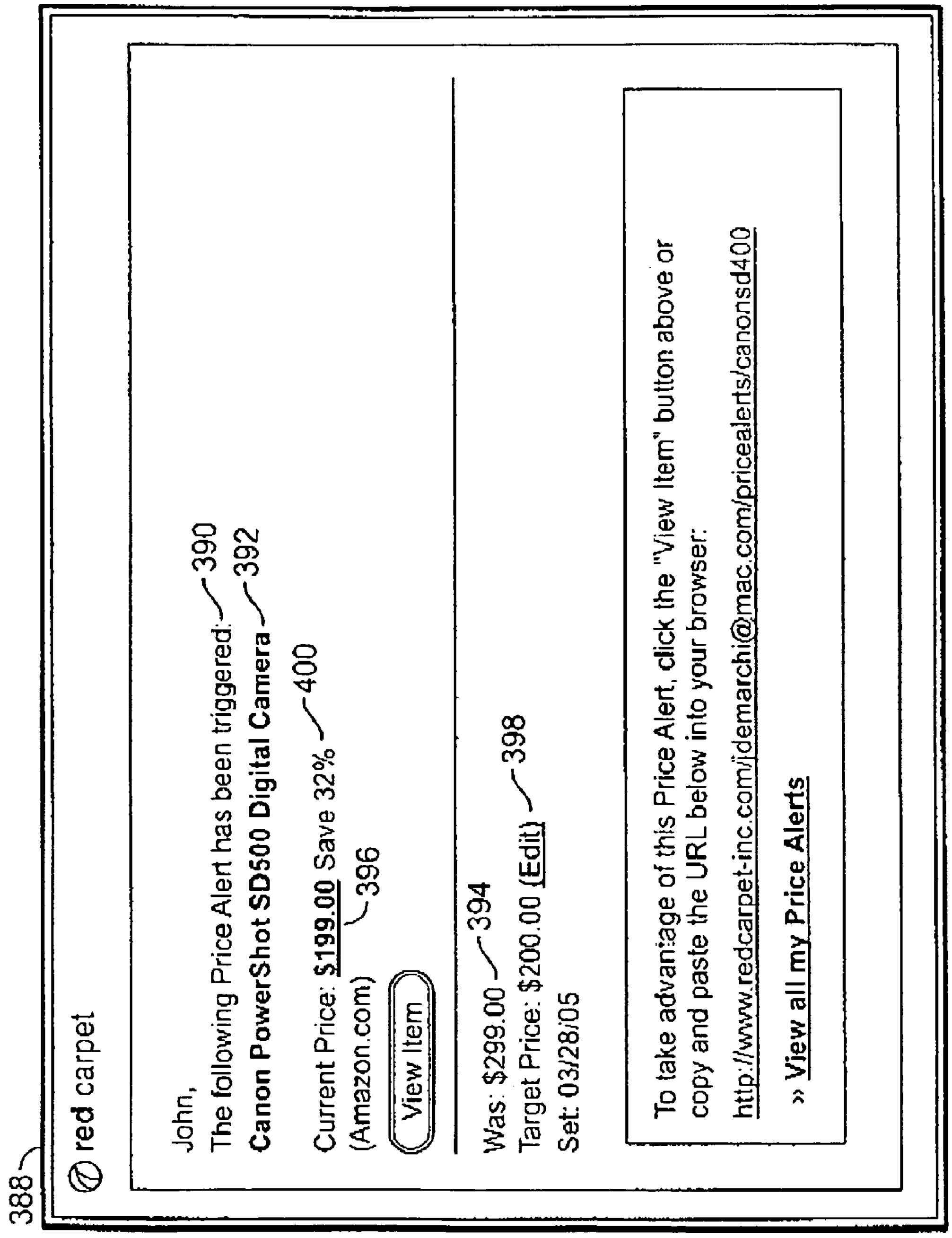
FIG. 24 is a diagram of an exemplary e-mail user notification according to one embodiment of the invention.

When an active alert is triggered, the system automatically generates a user notification. Such notification can take any form, including without limitation an e-mail, a toast, a mini-toast, an alarm, etc. In one embodiment, the notification is sent as an e-mail to the user. As illustrated in FIG. 24, the email notification 388 can indicate that the active alert has been met 390, identify the target product 392, anchor alert price 394, current price 396, target price 398 and savings 400 and provide merchant information and links to the merchants offering the price that triggered the alert.

In another embodiment, the price alert notification is a toast that notifies the user that an alert has been met and provides basic details including the name of the target product, the anchor alert price, target price, current price and savings, and the name of the merchant. The toast can also include a link to a price comparison grid page or the alerts page.

When a passive alert is triggered, the merchant whose price has triggered the alert is referred to as the passive alert merchant. The passive alert merchant's listing is the subject of the notification to the user. If multiple merchants trigger the same passive alert, the system will determine the passive alert merchant based on a set of rules that can be set to reflect a variety of conditions. For example, the rules could set the passive alert merchant based on the lowest net effective price, or the highest popularity ranking. Similarly, merchants that advertise or have a business relationship with the system operator can be given priority, or merchants may purchase a right of priority in the selection of the passive alert merchant.

In one embodiment, users have the ability to control the operation of many features of the client application by setting their user preferences. For example, users may be able to set a preference to limit the number of notifications that they receive within a given time period, or they may be able to select the type of notification they wish to receive when they are viewing a product detail page. Preferences can be offered for almost any feature, such as the number of seconds before a toast disappears, alternate notifications for price alerts such as email, automatic log-in to the system, etc.

Merchant Tools

Information gathered by the client and web-based applications about user behavior may also be used to provide opportunities for merchants to manage their sales yields by identifying and targeting latent consumer demand for specific products. The ability of the system to provide merchants with a detailed breakdown of existing consumer demand based on a broad range of information such as the setting of alerts and associated price-point continuum, enables merchants to input targeted promotions specifically designed to trigger alert thresholds and stimulate consumer demand.

As discussed above, the system is also designed to automate the creation of promotions based on pre-defined logic rules that generate promotions dynamically in response to existing conditions. For example, a merchant could set a rule that would offer an exclusive coupon sufficient to trigger a target number of alerts for a specific product if its inventory of that product reaches a specified level. The present invention includes a variety of tools for merchants that allow them to automate and improve their understanding of the market as well as historical consumer information and demand patterns, and make appropriate, targeted offers or promotions to users.

In one embodiment, information regarding the number of customers that have set active alerts for particular products would be made available to merchants. For example, such information may include the price point continuum representing all the active alerts set on the system for a particular product. This information may indicate to the merchant that there is a pool of consumers that is ready to purchase the product at a particular price point. In one embodiment, merchants can establish targeted offers to trigger the pool of active alerts and potentially drive those users to that merchant to purchase the target product.

In one embodiment, merchants would be provided with similar information regarding the number of passive alerts that have been set for a particular product based on users viewing either a product detail page 124 or a price comparison grid 136 for that product. The number of passive alerts and the passive alert prices that would trigger those alerts can similarly be used by merchants to target an offer or promotion that triggers passive alerts and drives demand to that merchant.

It will be understood by those skilled in the art that the system of this invention can capture a broad range of data that can be used to predict consumer demand on a product-specific basis. Such data includes the total number of unique users that have viewed a product across all online merchants, the price at which it was offered to those users, the number of those users that purchased the product, and at what price. The system can use this type of data to generate a demand curve showing the impact of a price change on demand, plotted over time. Network-wide pricing trends can also be used to analyze conversion differences among competing merchants so that a merchant can determine which strategies will be most effective in increasing its conversion rate.

In one embodiment, participating merchants are provided with tools and information that allow them to compete effectively when they are the anchor page merchant. As discussed above, the price comparison grid 136 may include a promotional offer or other incentive for the user to return and purchase the product from the anchor page merchant. Participating merchants can monitor user responses to pricing for different products, and set either static or dynamic promotions that are displayed only when a user responds to an exact match or substitute product notification generated from that merchant's product detail page 124. This gives the merchant precise control over the promotion, targeting those customers when they are ready to make a purchase.

In one embodiment, merchants selling an exact-match product are listed in the price comparison grid 136 in order from lowest net effective price to highest. While there may be paid or sponsored listings 324 outside the price comparison grid on the same page displayed to the user, position within the price comparison grid is determined organically by net effective price 258. However, a variety of tools may be offered to merchants that would allow them to influence their position within the organic results on the price comparison grid. The organic results are those that are selected based solely on the general rules defined in the algorithm that determines placement on the price comparison grid. For example, since positioning in this embodiment is based on net effective price, participating merchants could be provided with the ability to offer targeted coupons or promotions that would reduce their net effective price and thereby improve their placement on the price comparison grid. The inclusion of an automated promotional offer mechanism in the system enables merchants to influence their position in the system's organic results by changing the net effective prices without impacting the published price on the merchant's publicly available web site. This provides merchants with a mechanism that allows them to charge different prices in different sales channels in order to optimize sales and profit margins.

Such promotions could take almost any form based on a variety of automated logic rules, including both dynamic and static promotions. For example, a merchant could set a static 10% off promotion for a particular product that would be offered regardless of circumstances. In the alternative, a merchant could condition the display of the same promotion on the need for the offer to improve its position on a price comparison grid 136. Thus, if that merchant's position on the price comparison grid absent the coupon was first, no coupon would be offered. However, if its position absent the coupon was third or lower, the coupon would be offered and its position would improve accordingly. A merchant could also offer coupons that are valid for dynamic periods of time based on a variety of criteria, such as a coupon that is valid for the first 100 consumers, etc. As another example, coupons could be valid for specific redemption amounts in totality, such that a merchant can manage its campaign spend based on predefined budget levels. The system can automate such rules, and apply the coupon application logic at the product level against a very specific set of criteria.

In another embodiment, position on the price comparison grid 136 can be determined on factors other than price. For example, position can be determined based on a bidding system or other auction, based on a fixed price, or based on a mix of different criteria such as price and click-through-rate or yield.

In another embodiment, merchants have the ability to influence their position in the list of merchants on user notifications, such as exact-match toasts 230 or substitution/offer toasts. For example, where there is an exact match for a commodity product there may be a large number of merchants displayed on the price comparison grid 136. The user notification, however, may only have space to display the names of a small number of merchants. The same can occur with a substitution notification where there are a large number of potential substitute products. If positioning on the notification is based on price, then the same offer that influences position on the price comparison grid will influence position on the notification. However, the notification may also use different criteria for merchant inclusion. In one embodiment, merchants can pay to improve their likelihood of being displayed on the notification. Such sponsoring merchants could be displayed in a specific position every time they offer an exact match product, or they could pay for a specific position for certain products.

The system's ability to identify product detail pages 124 and extract product information from those pages allows it to offer both merchants and manufacturers the ability to dynamically generate targeted, product-specific promotional offers and present those offers directly to users actively viewing a particular product. This indicates that the user has some level of interest in purchasing a product with similar features. In response, the system can immediately serve a notification containing an offer from a competing manufacturer or merchant. The ability to offer real-time promotions targeting a competitor at the product, model, and even feature-specific level at the point of sale is extremely powerful.

For example, the system can determine when a user lands on a product detail page 124 displaying a CANON SD400 5 MegaPixel Digital Camera. Using automated logic rules, the system can then immediately serve a promotion for a competing manufacturer's 5 megapixel digital camera in real-time. This promotion could be in the form of a manufacturer's rebate or coupon good at any merchant, or it could be a co-branded promotion that is good only at a particular merchant. The notification can also include a link for further information about the product or to a merchant where it can be purchased.

Merchants and manufacturers can use this ability to deliver promotions in real-time to target promotions with extraordinary precision to consumers who are actively seeking a product that meets known specifications. A manufacturer can target customers actively considering purchasing a competing product at a point immediately prior to the potential sale. This allows manufacturers to divert potential customers at a critical decision-making point, rather than trying to reverse a buying decision after the fact or influence the next buying decision in the future. It also enables manufacturers to efficiently optimize and vary their promotional spending based on consumer purchase intent, rather than making promotions broadly available to the public.

As another example, since the web-application servers 118 will maintain user profiles that include the zip code of the users, a merchant with excess inventory of a specific product in a particular location could target a promotion for that product to users in particular geographic areas. Similarly, a manufacturer seeking to increase its market share for a particular product within a specific demographic group or in a particular geographic area can target its promotion to achieve that goal. A manufacturer with excess inventory of a product model with a specific feature or configuration, such as a computer with an 80 gigabyte hard drive, could target aggressive promotions to sell products with that feature or configuration. Moreover, as described above, the system allows merchants to generate dynamic coupons that are valid for specific time periods or to address specific inventory conditions automatically by providing relevant information to the system.

In addition to the ability to precisely target promotions as described above, promotions can be limited such that they are available only to users of the comparative shopping system. Thus, the promotion can be effectively restricted to a specific network-based retail channel, allowing the merchant to maintain pricing in other distribution channels.

Search Functionality

In one embodiment, the client includes a search function that allows the user to search the database system 106, any other database, or the entire network 102 for items relevant to the search query entered by the user. This search function may operate using a standard search algorithm, or it may offer enhanced search capability. In one embodiment, the search function uses two inputs into the search process in order to improve the relevance of the results. In one embodiment, the search function automatically uses as inputs both the user query terms, and the search context. Relevant search context may include simple information such as the current domain name active on the browser, or virtually any other known information about the user's web browsing behavior. This combination substantially improves the relevance of the results that are returned in response to a search query.

For example, if a user who frequents the web site www.thesimpsons.com enters the query term "homer" on a standard search engine, the search would likely return products relating to both the legendary Greek poet "Homer" and the contemporary pop culture icon "Homer Simpson" from the television show THE SIMPSONS. In this embodiment, however, the client application would recognize that the user's past browsing behavior indicates an interest in products relating to Homer Simpson, and would increase the ranking of results relating to Homer Simpson to reflect this information.

Figure 25:
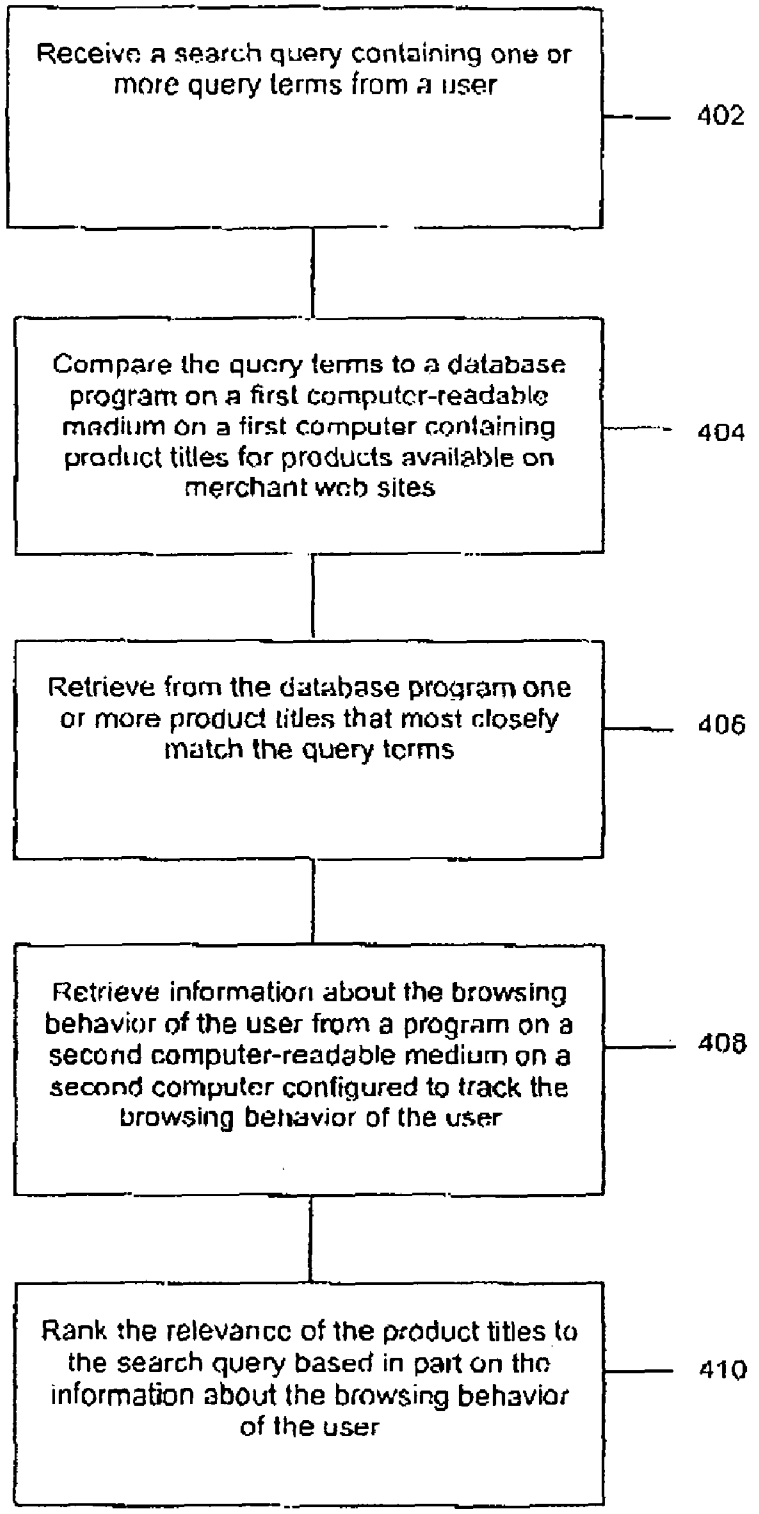
FIG. 25 is a flow chart indicating the steps of the process of performing an enhanced search according to one embodiment of the invention.

Referring to FIG. 25, the first step 402 in the process of improving search results based on the user's browsing behavior is to receive a search query containing one or more query terms from a user. The second step 404 is to compare the query terms to a database system program on a first computer-readable medium on a first computer containing product titles for products available on merchant web sites. The third step 406 is to retrieve from the database system program one or more product titles that most closely match the query terms. The fourth step 408 is to retrieve information about the browsing behavior of the user from a program on the user's computer that is configured to track browsing behavior. The fifth step 410 is to rank the relevance of the product titles to the search query based in part on the information regarding the user's browsing behavior.

The client application may operate in a variety of different modes. In one embodiment, the client can operate in the following modes: (1) on; (2) off; and (3) away. In the "on" mode, the client is fully functional with all systems operating in accordance with the preferences selected by the user. In the "off" mode, the client is not operating at all. In this embodiment, the client will be programmed to detect when the user is no longer present, and will then enter the "away" mode. In the "away" mode the client will suppress any notifications that would otherwise be presented on the display. If multiple notifications queue up while the system is in the "away" mode, a single notification that there are "multiple active alerts" available will be presented to the user.

In one embodiment, the client application makes available to the user a personalized dashboard. The user dashboard is a module that identifies and displays links to the user's price comparison grid history 280, active alerts, coupons, and other information of interest the user. In one embodiment, the dashboard defaults to a hidden view, where it is not displayed to the user but is indicated by a small tab or nub in the system display window. The dashboard may be displayed by clicking on the nub.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A method for identifying product-related information on a web page, the method comprising:

identifying one or more text nodes containing product-related information on a first web page;

generating one or more vectors to describe the locations of the text nodes containing product-related information on the first web page;

analyzing one or more of the vectors to identify one or more patterns;

generating, with a server comprising a matcher, a model from the one or more patterns that discriminates between text nodes that contain product-related information and text nodes that do not contain product-related information on a second web page;

transmitting the model to a client application on a users computer; and using the model to identify and extract product-related information from web pages as the web pages are displayed to the user.

2. The method of claim 1, wherein the first and second web pages are written using HTML programming language.

3. The method of claim 1, wherein the vectors are 4-place vectors.

4. The method of claim 3, wherein one field of the vectors represents the text of the text node.

5. The method of claim 3, wherein one field of the vectors represents the anonymous HTML tag path leading to the text node.

6. The method of claim 3, wherein one field of the vectors represents the indexed HTML tag path leading to the text node.

7. The method of claim 3, wherein one field of the vectors represents the attribute-annotated HTML tag path leading to the text node.

8. The method of claim 1, wherein the model includes one or more symbolic expressions that represent the pattern of text node locations.

9. The method of claim 1, further comprising using the model to crawl a plurality of web pages to identify and extract product-related information.

10. A system for identifying product-related information on a web page, comprising:

a first computer having a first computer-readable storage medium containing:

a copy of source code for a first web page, one or more first computer programs configured to parse the copy of the source code to identify all text nodes and analyze the text nodes to identify any text nodes that contain product-related information;

one or more second computer programs configured to generate vectors describing the locations of the text nodes containing product-related information, analyze one or more of the vectors to identify one or more patterns and generate one or more models that discriminate between text nodes that contain product-related information and text nodes that do not contain product-related information on a second web page; and a user computer coupled to the first computer having a second computer-readable storage medium, wherein the one or more models are transmitted to the second user computer, stored in the second computer-readable medium, and used to identify and extract information about one or more products available for sale on one or more merchant web pages as the web pages are displayed to the user.

11. The system of claim 10, wherein the web pages are written using HTML programming language.

12. The system of claim 10, wherein the vectors are 4-place vectors.

13. The system of claim 12, wherein one field of the vectors represents the text of the text node.

14. The system of claim 12, wherein one field of the vectors represents the anonymous HTML tag path leading to the text node.

15. The system of claim 12, wherein one field of the vectors represents the indexed HTML tag path leading to the text node.

16. The system of claim 12, wherein one field of the vectors represents the attribute-annotated HTML tag path leading to the text node.

17. The system of claim 10, wherein the model includes one or more symbolic expressions that represent the pattern of text node locations.

18. The system of claim 10, wherein the model is used to crawl web pages to identify and extract product-related information.

* * * * *